(12) United States Patent
Steinberg

(10) Patent No.: US 7,712,135 B2
(45) Date of Patent: May 4, 2010

(54) PRE-EMPTIVE ANTI-VIRUS PROTECTION OF COMPUTING SYSTEMS

(75) Inventor: Kenneth D Steinberg, Nashua, NH (US)

(73) Assignee: Savant Protection, Inc., Hudson, NH (US)

( * ) Notice: Subject to any disclaimer, the term of this patent is extended or adjusted under 35 U.S.C. 154(b) by 1173 days.

(21) Appl. No.: 10/912,611

(22) Filed: Aug. 5, 2004

(65) Prior Publication Data

US 2006/0031937 A1 Feb. 9, 2006

(51) Int. Cl.
*G06F 11/00* (2006.01)
(52) U.S. Cl. .............................. 726/24; 726/22; 726/26; 726/32; 713/188
(58) Field of Classification Search ................. 713/188, 713/165; 726/22, 24, 26
See application file for complete search history.

(56) References Cited

U.S. PATENT DOCUMENTS

| | | | |
|---|---|---|---|
| 5,504,814 A | | 4/1996 | Miyahara |
| 5,563,946 A | * | 10/1996 | Cooper et al. ................. 705/56 |
| 5,727,061 A | * | 3/1998 | Johnson et al. ............. 713/165 |
| 5,940,513 A | * | 8/1999 | Aucsmith et al. ........... 713/187 |
| 5,974,549 A | | 10/1999 | Golan |
| 6,092,194 A | | 7/2000 | Touboul |
| 6,167,520 A | | 12/2000 | Touboul |
| 6,185,678 B1 | | 2/2001 | Arbaugh et al. |
| 6,330,670 B1 | | 12/2001 | England et al. |
| 6,567,917 B1 | * | 5/2003 | Ziese .......................... 713/187 |
| 6,658,571 B1 | | 12/2003 | O'Brien et al. |
| 6,735,700 B1 | * | 5/2004 | Flint et al. ..................... 726/24 |
| 6,760,441 B1 | | 7/2004 | Ellison et al. |
| 7,137,117 B2 | * | 11/2006 | Ginsberg .................... 718/102 |
| 7,201,662 B2 | * | 4/2007 | LeMay et al. ................. 463/43 |
| 7,284,277 B2 | * | 10/2007 | Lewis .......................... 726/29 |

(Continued)

FOREIGN PATENT DOCUMENTS

SE 2002000000938-04 3/2002

(Continued)

OTHER PUBLICATIONS

Matthew Schmid, Frank Hill, A.K. Ghosh; Preventing the Execution of Unauthorized Win32 Applications, Proceedings of DISCEXII'01; 2001; 9 pages; IEEE; Dulles, VA, USA.

(Continued)

*Primary Examiner*—Nasser Moazzami
*Assistant Examiner*—Fikremariam Yalew
(74) *Attorney, Agent, or Firm*—Vern Maine & Associates

(57) ABSTRACT

A system is provided that strongly inhibits infection and spread of computer viruses. Valid executable software files and supporting files, even files provided by mass-released commercial software, are associated with a numeric key that is unique to each individual computer running the software. For a file to be processed by the central processing unit (CPU) of the computer, the presence of a valid key must first be verified. Every valid executable file, including files relating to the operating system and application layer code, is provided with a unique key. Thus, viruses that attempt to gain access to the CPU to perform unauthorized actions, including replication, are prevented due to lack of a valid execution key. Execution keys are generated locally on each individual computer using a variety of methods. Execution keys can be regenerated if the security of a computer system has been compromised, or appears to have been compromised.

30 Claims, 14 Drawing Sheets

U.S. PATENT DOCUMENTS

| | | | | |
|---|---|---|---|---|
| 7,350,081 | B1* | 3/2008 | Best | 713/190 |
| 7,392,376 | B2* | 6/2008 | McKenney et al. | 713/152 |
| 7,418,737 | B2* | 8/2008 | Grupe | 726/33 |
| 2001/0034840 | A1* | 10/2001 | Sion et al. | 713/193 |
| 2002/0023220 | A1 | 2/2002 | Kaplan | |
| 2002/0099952 | A1 | 7/2002 | Lambert et al. | |
| 2003/0076824 | A1* | 4/2003 | Benayoun et al. | 370/389 |
| 2003/0167397 | A1* | 9/2003 | Mangold et al. | 713/189 |
| 2004/0025015 | A1* | 2/2004 | Satterlee et al. | 713/164 |
| 2004/0039921 | A1 | 2/2004 | Chuang | |
| 2004/0054928 | A1 | 3/2004 | Hall | |
| 2004/0064732 | A1 | 4/2004 | Hall | |
| 2004/0098599 | A1* | 5/2004 | Bentley | 713/187 |
| 2005/0004873 | A1* | 1/2005 | Pou et al. | 705/51 |
| 2005/0010804 | A1 | 1/2005 | Bruening et al. | |
| 2005/0091516 | A1 | 4/2005 | Mcdermott | |
| 2005/0108562 | A1 | 5/2005 | Khazan et al. | |
| 2006/0126826 | A1* | 6/2006 | Rega et al. | 380/28 |

OTHER PUBLICATIONS

Ian Goldberg, David Wagner, Randi Thomas, Eric A. Brewer; A Secure Environment for Untrusted Helper Applications; Jul. 1996; 13 pages; UCAL Berkley, CA, USA.

Steven M. Bellovin, Jonathan M. Smith; Sub-Operating Systems: A New Approach to Application Security; Apr. 2001; 18 pages; Univ. Of PA, USA.

Fred Cohen; Models of practical defenses against computer viruses; 1989; 11 pages; Computers & Security—vol. 8; USA.

Davida, Desmedt, Matt; Defending Systems Against Viruses through Cryptographic Authentication; May 1989; 6 pp; 1989 Symposium on Security & Privacy; Oakland, CA, USA.

Berg C.; How Do I Create a Signed Applet?; Sep. 1987; 3 pages; Dr. Dobb's Journal, M&T Publisher, vol. 22; Redwood, CA, USA.

Vladimir L. Kiriansky, Derek L. Bruening, Saman P. Amarasinghe; Secure Execution of a Computer Program; 2003; 16 pages; MIT, Cambridge, MA, USA.

Lein Ham, Hung-Yu-Lin, Shoubrto Yan; A Software Authentication System for the Prevention of Computer Viruses; 1992; 4 pp; Univ. of Science & Technology; Hefei, Anhui, China.

Microsoft Corp.; Ensuring Accountability and Authenticity for Software Components on the Internet, Microsoft Authenticode Technology; Oct. 1996;10 pp; Microsoft; USA.

Zhang, X. N.; Secure Code Distribution; Jun. 1997; 3 pages; IEEE Online Library vol. 30; USA.

Gene H. Kim and Eugene H. Spafford; The Design and Implementation of Tripwire: A File System Integrity Checker; 1994; 12 pages; ACM; West Lafayette, IN, USA.

Maria M. Pozzo and Terence E. Gray; An approach to containing computer viruses; 1987; 10 pages; Computers & Security, vol. 6; Los Angeles, CA, USA.

Adam J. O'Donnell, Harish Sethu; Software Diversity as a Defense Against Viral Propagation: Models and Simulations; 2003; 7 pages; Drexel University, Philadelphia, PA, USA.

* cited by examiner

Figure 1 - Prior Art

PRE-EMPTIVE ANTI-VIRUS PROTECTION OF COMPUTING SYSTEMS

FIELD OF THE INVENTION

This invention relates generally to computer security, and more particularly to anti-virus strategies for computing systems.

BACKGROUND OF THE INVENTION

Many products today include embedded computing systems, from the space shuttle to hand-held gaming pods, and therefore operate according the same underlying principles. A series of computing instructions, called a "program", an "application", or an "executable", are read into a memory device of the computing system, and then executed by one or more computational processing units (CPUs). As a result of executing these computing instructions, the computing system will perform a series of actions on behalf of the user, such as display a web page on a home computer, or auto-dial a phone number on a cell phone, for example.

The computing instructions are known as "software", and are executed using the components of the computing system, known as "hardware". Many embedded computing systems, such as the embedded computing systems incorporated in microwaves, have a predetermined set of instructions, running the same program repeatedly. This type of program is fixed, and consequently does not allow the user of the system to change the manner in which it functions by re-programming or adding additional functions/applications. Other products, such as personal computers and mainframes, allow the creation and installation of a variety of programs.

One of the most important advances in computing was the segregation of system function software and application software. The software that relates to system functions is called the Operating System (OS). This set of instructions is responsible for creating a steady-state computing environment within which a variety of application programs can be executed. This segregation of Operating Systems and applications has enabled the development of thousands of programs which can be installed on millions of computing systems around the world. Some programs, such as operating systems (OS), become standardized and are mass-distributed in identical form to millions of users. The most common example of a standard OS is the Windows® operating system developed by Microsoft®. Other typical examples of operating systems with similar flexibility include Linux®, MacOS®, and PalmOS®—each having the capacity to run a variety of custom applications.

Numerous software development companies mass-produce software, frequently releasing new and updated applications to the public. Large software engineering firms develop and release complex applications for use on millions of computing systems. Months are spent developing and testing new applications until a level of quality and functionality is reached, whereupon development is "frozen". Then, the application (or upgrade), potentially containing millions of lines of code, is written onto distribution media and released for sale. All purchasers of this particular software release will receive an identical copy of the new application for their own use.

Distribution of identical copies of software enables software development companies to more easily support and train high volumes of customers, because each copy of the application software has known and consistent behavior—the exact same multi-million lines of code are on every system.

However, the same computing logic flaws that create computer security vulnerabilities are also the same on every system. Examples of replicated computer security vulnerabilities can be found in every operating system and application on the market. Malicious and resourceful programmers, called "hackers", find the flaws in computing logic, and using such knowledge, gain unauthorized access to the computing resources of large numbers of computers. With unauthorized access, the hackers then can perform unwanted and malicious functions. A hacker can totally disable a computing system, or just silently perform unauthorized functions. Unauthorized functions include, but are not limited to, data modification, remote control of computing resources, and theft of personal information (identity theft).

One of the more popular hacking techniques is to release a "computer virus"—a program which replicates itself much like the common cold. A computer virus exploits the logic flaws inherent in software, enabling it to spread from one computer to another, infecting each along the way. The result is mass replication and spread to many other computing systems that also run the same software and have the same computer security vulnerability, resulting in lost time, lost data, and lost productivity. For example, in 2003 the economic impact of computer viruses in the United States was said to be over $55 Billion.

In an attempt to control such breaches in computer security, numerous software companies create "security patches" and "anti-virus software" intended to seal holes in the computing logic applications ranging from Operating Systems to Internet Browsers, are all now subject to constant software updates as a means of removing these flaws. Once a logic flaw or a new computer virus is discovered, software companies release modifications (i.e. patches or inoculations) to the application in an attempt to correct the flaw or "plug the hole", or to remove the new virus from computing systems. Unfortunately, after a logic flaw has been found, for example, due to the spread of a computer virus, some damage has already been done to many computing systems that run the vulnerable software. For many the effort is too little, too late.

Even after a new security patch is released, or after a new revision of anti-virus software has been distributed, millions of computing systems still get infected by computer viruses. This happens because many computer users never install the new security patch, or do not obtain the new revision of anti-virus software. Some computer users do not have anti-virus software at all, and those that do have antivirus software may not patch their applications in time to stop the infection. All in all, this reactive approach to controlling computer viruses means that infection of some computing systems is inevitable. Since 1986, Microsoft has release over 350 patches to their applications. Symantec, a leading antivirus software company, has released over 66,000 "inoculations" as of April, 2004. Nevertheless, computer viruses are still a serious threat to computers all over the world, continuing to cause unacceptable levels of economic damage.

Operating systems from the top three development companies, Microsoft, Apple and Sun, are widely known to comprise 30, 20 and 15 million lines of code respectively, not including the code contained in numerous patches that are frequently released. The shear complexity and enormity of these applications inevitably results in logic flaws and vulnerabilities. Most software companies work diligently to reduce the occurrence of software flaws and vulnerabilities, but the size of the code base makes it impossible to release perfect applications all the time. Knowing this, hackers continually look for flaws and vulnerabilities so as to exploit them, confident that a weakness in one system means a weakness in the millions of computer systems that are running identical software.

As code size and complexity increases, the likelihood of introducing logic flaws and security vulnerability also increases. Extrapolating these trends suggests that hackers will increasingly have an advantage for the foreseeable future. Even though the major software vendors continue to patch and inoculate computer systems, the industry continues to find itself one step behind the hackers, because the flaws and vulnerabilities must first be exposed by successful hacker attacks, with the attendant cost and inconvenience. Only after potentially expensive damage has been done can a fix be developed and manufactured, and then distributed to at least some of the millions of vulnerable users.

Present day antivirus strategies include detecting the digital footprint of a virus, and then sequestering it until an end-user can decide on a course of action. The digital footprint of a virus is determined by examining known viruses to determine how they function, and how they affect computing systems. There are numerous ways in which a virus might try to infect a computing system, such as placing new files on a system, changing existing files (e.g., by addition, modification, or deletion of contents), or forcing a system to act contrary to it's programming (e.g., buffer overflow).

These antivirus strategies are based upon the same flawed principles—they all require the actual existence of a virus, infection by the virus, and observation of the harmful effects of the virus, to determine a footprint. Consequently, many systems are infected before a defense against the virus can be devised. Also, such known anti-virus strategies demand repeated scanning of all or most of the files on a computing system by anti-virus software, even though most of the files on an infected computing system are harmless, thereby collectively wasting enormous amounts compute power. Further, known anti-virus strategies require the widespread distribution of updates to antivirus software to in order to counteract new viruses, costing users millions of dollars in service contracts, as well as even higher losses accrued as a result of the negative impact on systems which do not contain antivirus software.

Further, known anti-virus strategies are so ineffective that additional security resources must also be employed to decrease risk of cyber-attack, at yet further cost. These additional security resources may include a device called a "firewall", which attempts to detect and remove malignant code before it reaches a computing system, or renders a system less "visible" in an attempt to protect it from probing by hackers. Owners and managers of computing systems may also be forced to turn off resources such as certain Internet service ports in order to protect vulnerabilities in flawed logic.

Nevertheless, current methods and equipment, alone or in combination, have failed to stop the infection and spread of computer viruses.

SUMMARY OF THE INVENTION

The system of the invention strongly inhibits infection and spread of computer viruses. According to the invention, valid executable software files and supporting files, even files provided by mass-released commercial software, are associated with a numeric key that is unique to each executable on every individual computer running the software.

Thus, the invention enables a computing system running mass-distributed software to be unique as compared to other systems running functionally identical application software. A hacker must therefore attack each unique system in a unique way, and cannot therefore leverage and exploit the inherent sameness of mass-distributed software. To overcome the inherent differentness of a plurality of computer systems each incorporating the invention, a hacker would be forced to exert exceedingly higher levels of effort in proportion to the number of unique computer systems that include the invention, both to overcome the enhanced level of security of each individual system due to the invention, and to exert these efforts over many thousands of computer systems protected by the invention. The increased difficulty of successful viral infection due to use of the invention, together with the reduced scale of any successful virus attacks, will reduce the likelihood that hackers will bother attempting to infect computers with viruses, further increasing the effectiveness of the invention to thwart computer viruses. In addition to providing substantial impediments to hackers, the number of hackers that possess the technical skills to overcome the new security technology of the invention will be less than the number of hackers that currently possess knowledge of new virus creation. Thus, the invention may provide a level of security high enough to substantially stop computer virus infections, and to also virtually eliminate the spread of such infections.

The computer security strategy of the invention is to make each system unique, even when running industry-standard application software and/or operating system software. This strategy is based on certain core assumptions and guidelines (which are not advantageously exploited by the known current computer security strategies):

There will always be malicious code and malicious persons attempting to infect computing systems, and this will result in some systems becoming infected.

The more computing systems differ from each other, and/or change over time, the more they present a challenge to hackers and viruses, thereby making computer security pre-emptive, rather than reactive.

Emphasis should be placed more on deterring the spread of computer viruses than on completely preventing infection. It is inevitable that some users will inadvertently permit infection of their own systems.

Nevertheless, proper emphasis on preventing spread of computer viruses will reduce the impact of the mistakes of individual users inadvertently permitting infection of their individual systems, without putting at risk many other users of systems running functionally identical application software.

A computer security strategy implementation should not negatively impact the ability of software manufacturers to mass-distribute identical or like copies of application software and operating system software.

As previously discussed, the continually increasing complexity of computing systems, and the associated operating system, and application software, is such that there will always be new ways to gain access to certain systems, such as by infection by a new computer virus. Moreover, even on secure systems there will always be a way to take advantage of human error and gullibility to achieve malicious results. Consequently, deterring or stopping the spread of computer viruses is an essential aspect of any effective solution. Such a solution would substantially reduce the economic harm caused by computer viruses to all users of computing systems, including personal, and business users. To minimize implementation costs to the computing industry, the invention provides a method that requires only acceptable and relatively inexpensive change. The invention does not require modifications to application manufacturing and distribution, because according to the invention, changes to enhance security include changes made to the Operating System itself.

According to the invention, all executable files must be associated with a valid execution key to gain access to computing resources of a computing system, such as a CPU (computational processing unit) and/or system memory and/or system bus, as well as other I/O devices. This requirement guarantees that those files which do use computing resources are explicitly authorized to do so by the system administrator or the end user, since only the system administrator and the end user can authorize a file by associating an execution key therewith. Executable files which attempt to gain access to computing resources without a valid execution key can be quarantined, and thereby denied the ability to run. Since the only way for an application to obtain an execution key is with the approval of the system user or administrator, files that contain malicious applications such as viruses which are downloaded to a computer system will not be able to execute, and consequently, will not be able to commandeer the computer system, or spread to other computer systems. Similarly, if a virus application is mistakenly given a key that enables it to run on one system, perhaps due to a clever ruse, or by duping a gullible or careless user, the execution key provided to the virus will not be valid on any other system, since all keys are unique, thereby completely preventing the spread of the malicious code of the virus to other computer systems.

In one aspect, the invention provides superior security by enhancing scheduling in a computing system by which executable code is presented to the CPU for processing. In most computing systems, applications share computing resources by means of a scheduling queue. There are a variety of techniques for queuing and prioritizing applications, but in general the request to use the CPU is passed on to a scheduling process which determines when and how the application is allowed to execute. In a computing system incorporating the invention, before the application is allowed to transfer from the scheduling queue to the CPU, an execution key found in the file header of the application is compared against a known good key stored in a key database. If the key matches or is otherwise determined to be valid, the application is allowed to run. If the keys (the stored known good key and the execution key) are not identical or valid then the application is quarantined and not given access to computing resources.

An execution key is embedded in a program during its installation onto a computer system. Each execution key is unique to each application on each computer system. An execution key may be placed in the header, the body, or the tail of an executable file, and may be further customized by the implementer of the executable file depending upon the keying technique used and the Operating System. Each file and operating system represents an opportunity to embed a key. For example, the Linux ext3fs file structure contains a field, i_node_acl which could be modified to store an execution key. Microsoft's® NTFS security descriptor also contains fields, such as the Security ID (SID) which can store an execution key. Many file systems contain fields which can be used to store execution keys, or are extensible in a manner that allows additional fields to be added. Alternatively, it is also possible to place a key within the file body itself.

Key location can be static or dynamic, allowing a key to be placed anywhere in the data portion of the file itself. Static placement places the key in a consistent predetermined location. Dynamic placement of the key enables the key to be placed dynamically anywhere in the data portion of the file, a technique which also possess the ability to deter spoofing portions of a file, since any replacement of file contents might inadvertently invalidate the key. File tails may also be employed, adding the execution keys via custom file structures linked to the end of the data portion of a file. While practicable, this method may not represent the most effective mode, because the whole file must be either cached or searched to acquire the keys.

The keying technique for creating keys may utilize any number of tagging methods already in existence, or newly created methods. Examples of existing methods include Public Key Encryption, Arithmetic Mutation, or Dynamic Key Encryption. Use of arithmetic mutative keys, for example, could include the placement of an execution key in the file header where it can be quickly retrieved and validated against a validation key computed from an arithmetic store. This quick retrieval and computation of keys also provides key diversity due to the use of the mutating arithmetic equations. Similarly, any public key encryption scheme could be employed with the scheduler and the file system acting as clients in the key exchange scheme. An additional process can be programmed to provide third party authentication. In some applications, network bound authentication resources can be used, depending upon speed and response constraints.

Keying of an executable file may also be explicit or implicit. It is entirely possible that an implicit key might be employed, for example, by encrypting all or part of an executable file. It is feasible to encrypt an executable file using one or more keys and have the act of properly decrypting the executable file be the inherent validation of the file. If a file was encrypted with an invalid key, such as would be true for a virus or hacking attempt, the resulting undecrypted file would be invalid. Implicit keying methods might be used in high security environments, or in computing environments where the added computational overhead due to encryption and decryption is not prohibitive.

The keying technique used to validate execution keys is completely a matter of preference on part of the programmer. The invention can be used in conjunction with any Operating System (OS), and therefore the keying technique selected depends on what the OS can support.

With any of these keying systems, additional care must be taken to make sure keys cannot be stolen. This is achieved by making additional security modifications to file system functions. Since execution keys are assigned during installation, a virus file would have to, in most cases, find a way to steal a key in order to be able to run on a system. The most direct method for stealing a key would be to copy a previously keyed file and attach a virus to the copy. A similar approach might include stealing only the file header and using it for a new virus file. To counter these and other techniques, operating systems enhanced by the invention are also modified such that the copying of execution keys is not permitted, unless copying of execution keys is initiated by a privileged user, such as an administrator. Virus spread is still thwarted, even if the administrator is tricked into installing a virus, thinking it is a valid file, because the key assigned to it on one system will not be valid on another due to the requirement of the invention that each key for each application on each system must be unique thereby preventing infection of other computer systems. Thus, the mistake on the part of one user of widely used software does not impact other users of the software.

As an example, one of the most common techniques of viruses, such as the MyDoom computer virus, is to trick a user of email into executing an attachment. In a computer system that incorporates the invention, this executable attachment would not contain a valid key, and would therefore be immediately questioned or quarantined. Even if a particular user did authorize the virus to run on his or her system, the subsequent infected emails sent out would not contain an execution key which would work on other systems. The infection would thereby be limited to only one system.

Also, to create a constantly changing environment that further enhances system security, the invention also allows the system administrator/owner to change keys at any time, via any number of methods. This can be performed manually or automatically. In this way, each system can continually change the keys required to access computing resources. This solves one of the problems with present day systems, as the algorithms used to create security are widely known and static. Once the equation is know, the solution can be reverse engineered. According to the invention, the keys can be completely changed quickly, and repeatedly. If a hacker is able to infect a system, spread of the infection can be efficiently prevented by rekeying the system, or surrounding systems.

Another important benefit of the invention is the minimal impact it has on software developers that incorporate the invention in their products. All of the enhancements according to the invention affect the Operating System of a computer, and do not change how individual applications are developed. The only real impact seen by a software vendor is the change in the installation procedure, since the invention requires the installing party to authorize the attachment of execution keys to any newly installed applications.

Accordingly, one general aspect of the invention is a method for enabling a computing system to resist infection by a computer virus. In this general aspect of the invention, the computing system performs the method, including receiving an executable file into the computing system, determining whether there is a key associated with the executable file, and if there is a key associated with the executable file, verifying the validity of the key. Further, only if the key is valid, processing the executable file with a computational processing unit (CPU) of the computing system.

In a preferred embodiment, determining includes determining whether the executable file is decrypted, and verifying the validity of the key includes decrypting the executable file with a key associated with the executable file.

In another preferred embodiment, the key associated with the executable file is unique to the executable file.

In another preferred embodiment, verifying the validity of the key includes comparing the key to a valid execution key. In an alternate preferred embodiment, verifying the validity of the key includes validating the key without reference to another key.

In yet another preferred embodiment, if determining whether there is a key associated with the executable file determines that there is no key associated with the executable file, and if a user provides authorization, a valid key is associated with the executable file. Alternatively, if determining whether there is a key associated with the executable file determines that there is no key associated with the executable file, and if a user provides authorization, the executable file is executed.

In another preferred embodiment, the key is associated with the executable file upon installation of the executable file onto the computing system.

Another general aspect of the invention is a method for installing software on a computing system so as to inhibit infection and spread of computer viruses. The method includes loading the software into the computing system so as to provide at least one executable file stored in the computing system; associating a key with the executable file; and storing key information in a key store of the computing system for validating the key.

In a preferred embodiment, the key associated with the executable file is unique to the executable file. In a further preferred embodiment, associating a key includes encrypting the executable file with the key. In another preferred embodiment, the key information is a key that matches the key associated with the executable file.

In further preferred embodiments, the key information is an equation for providing a key that matches the key associated with the executable file. It is also possible for the key information to be an equation for validating the key associated with the executable file.

Other preferred embodiments include embodiments wherein associating a key with the executable file includes including a key in the header of the executable file, and/or the footer of the executable file, and/or the body of the executable file.

In some preferred embodiments, the software is commercially available software.

In another preferred embodiment, every valid executable file, including files relating to the operating system and application layer code, is provided with a unique key.

In yet another general aspect of the invention, an improved operating system for a computing device includes a determiner that determines presence of a key associated with an executable file; a verifier that verifies validity of the key so as to determine presence of a valid key associated with the executable file; and an execution queue for queuing a plurality of executable files for processing by a processor of the computing device, each executable file being associated with a valid execution key.

A preferred embodiment of this general aspect further includes a scheduler, cooperative with the determiner, that schedules executable files for execution by a computational processing unit (CPU) of the computing device.

Another preferred embodiment of this general aspect of the invention further includes a quarantine unit that isolates an executable file that is not associated with a valid key.

In another preferred embodiment, the determiner determines presence of a key associated with an executable file by reading a header of the executable file. In an alternate embodiment, the determiner determines presence of a key associated with an executable file by reading a footer of the executable file. In another alternate embodiment, the determiner determines presence of a key associated with an executable file by reading a body of the executable file. In still another preferred embodiment, the determiner determines the presence of a key associated with an executable file by detecting encryption of the file.

In more preferred embodiment, the verifier verifies validity of the key by comparing the key using key validity information. Also, the verifier verifies validity of the key by decrypting the executable file using the key.

Another general aspect of the invention is a system for use in a computing system, the computing system having a scheduler, an execution queue, and a computational processing unit, the system being for helping the computer system to resist infection by a computer virus. The system includes a verification unit, cooperative with the scheduler, for determining the presence of a key associated with an executable file stored in the computing system, and for verifying the validity of the key so as to determine the presence of a valid key associated with the executable file, a valid key being required to process the executable file with the computational processing unit.

In a preferred embodiment of this system, the verification unit determines the presence and validity of a key associated with the executable file by attempting to decrypt the executable file using a key associated with the executable file. In another preferred embodiment, the verification unit includes a validation unit for verifying the validity of the key, and for providing one of an executable file associated with a valid key, and an executable file not associated with a valid key; and a quarantine unit, cooperative with the validation unit, for sequestering an executable file not associated with a valid key.

In a further preferred embodiment, the quarantine unit is also for one of: deleting the executable file not associated with a valid key; tagging the executable file not associated with a valid key so as to render the executable file non-executable; allowing execution after communicating the existence of the virus; allowing execution and gathering information about the virus; and saving the virus for further study.

In yet another embodiment, the validation unit verifies the validity of the key by comparing the key with a valid execution key. In a further preferred embodiment, comparing the key with the protected key includes: performing a logical NOT operation on the key to provide an inverse key; performing a logical XOR operation on the inverse key and the protected key to as to provide a key comparison result; and comparing the key comparison result to a selected value to determine the validity of the key.

Another general aspect of the invention is a computer-readable medium that incorporates the operating system software of a computing system, the operating system software being improved so as to substantially reduce the ability of computer viruses to infect the computing system. In this general aspect of the invention, the operating system causes the computing system to: for each executable file loaded onto the computing system, determine presence of a key associated with the executable file; verify validity of the key so as to determine presence of a valid key associated with the executable file; and process the executable file using a processor of the computing system only if the presence of a valid key associated with the executable file has been verified.

In preferred embodiments, the computer-readable medium is a signal received by the computer system, and/or the computer-readable medium is an information storage device.

Another general aspect of the invention is a method for preventing further infection by a computer virus due to the spread of the computer virus from a first computing system to a second computing system. This method includes assigning a first key to an executable file containing the computer virus that does not have a valid key, the first key being valid only on the first computing system; executing the executable file containing the virus on the first computing system, and consequently communicating an executable file containing the virus and first key to a second computing system; receiving at the second computing system the executable file containing the virus, and verifying at the second computing system whether a key that is valid on the second computing system is present; and placing the executable file containing the virus and the first key in quarantine upon verification that the first key is not valid on the second computing system, and consequently not allowing the executable file to execute on the second computing system, thereby avoiding infection by the virus of the second computing system, and avoiding further spread of the virus to a third computing system.

In a preferred embodiment, when receiving at the second computing system the executable file containing the virus, the executable file also contains first key.

Still another general aspect of the invention involves a computer-readable transmitted signal incorporating operating system software of a computing system, the operating system software being improved so as to substantially reduce the ability of computer viruses to infect the computing system, the operating system causing the computing system to: for each executable file loaded onto the computing system, determine presence of a key associated with the executable file; verify validity of the key so as to determine presence of a valid key associated with the executable file; and process the executable file using a processor of the computing system only if the presence of a valid key associated with the executable file has been verified.

In a preferred embodiment of this general aspect of the invention, the computer-readable transmitted signal originates from one of: a network, a fiber-optic cable, a telephone wire, a radio transmitter, a microwave transmitter, a satellite dish, a cellphone, an automobile, a modem, and a hot-spot.

BRIEF DESCRIPTION OF THE DRAWING

The invention will be more fully understood by reference to the detailed description, in conjunction with the following figures, wherein.

DESCRIPTION OF THE PREFERRED EMBODIMENTS

Figure 1:
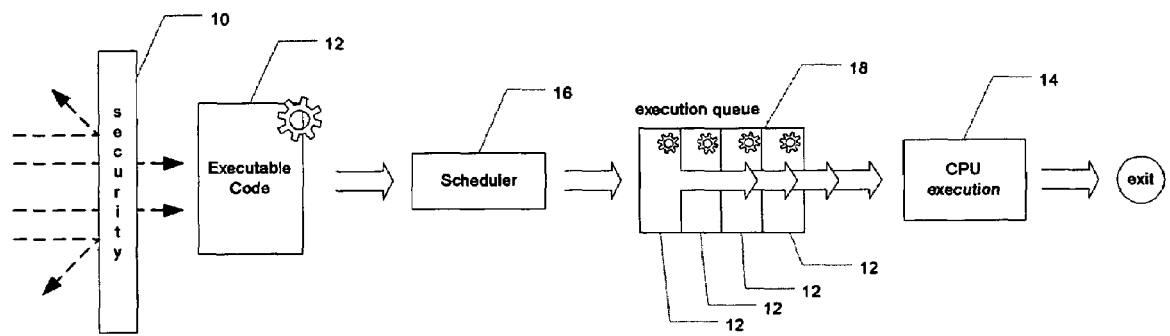
FIG. 1. is a block diagram depicting the prior art with respect to scheduling and execution of computer programs in a computer system.

With reference to FIG. 1, other than the commonly used security barriers 10, such as firewalls, conventional operating systems provide all executable code 12 (denoted by the gear icon superimposed on a rectangular block) with open access to computing resources (such as the CPU) 14 within a computer system. Any executable code 12, whether an application software module or a part of the operating system, can request the use of system computing resources 14. System computing resources include one or more of the CPU, system memory, and system I/O subsystems, such as internal buses, I/O cards and storage media.

Typically, for example, executable code 12 is presented to a scheduler 16, which arranges access to an execution queue 18. The execution queue 18 then sequentially provides the executable code 12 to the CPU 14 for execution. Thus, in conventional computer systems, there is no challenge to, or validation of, the origin or nature of the queued executable code. The working assumption is that any application software present is "friendly", and consequently that any executable code which has passed through security screening 10 is valid. The problem is that most of this screening, whether it is on-system software or network-based protection systems, cannot effectively filter out malicious code. The invention, sometimes referred to herein and elsewhere as "Savant™", addresses this problem.

Once an application is present in the computer system, stored in memory or on disk, for example, execution of the application software depends on the occurrence of an enabling event, such as a mouse click, a timer signal, or the end of a device wait condition, which then results in a request to use the CPU.

After the request is made, using any of a variety of queuing techniques, the application eventually is given a slot of time in which execution of the code is performed by the CPU. At the completion of execution, the exhaustion of allotted time, or upon entering a new wait state, the CPU is relinquished. This technique of queuing for computing resources, such as the CPU, is commonly used. Variations of the queuing technique involve the manner in which the scheduling is performed, or the allocation of the CPU amongst competing applications. Unfortunately, as a result of this open design, both authorized and unauthorized (e.g., virus) applications can execute freely on a computer.

Computing systems store and process two types of information; programs (referred to as: executables, applications, code, etc.) and data. Most computing systems and their associated storage systems (disk drives, memory, tape, CD-ROM, etc.) contain an overwhelming amount of data information as compared to the amount of program information contained. On everyday personal computers, typically less than 10% of the total number of files stored are actually executable files, the rest of the files containing data and supporting documentation. The data files themselves represent no threat to computing systems. They are simply used as input for executable files. Only files containing executable code can use computing resources and systems. A data file contains no computing instructions, and therefore a data file cannot "infect" a computing system. Consequently, it is inefficient and wasteful of computing resources to repeatedly search all files for virus foot-prints, when all that really matters is finding unauthorized and/or malicious executable files, and preventing such files from gaining access to the CPU, or other system resources.

Figure 2:
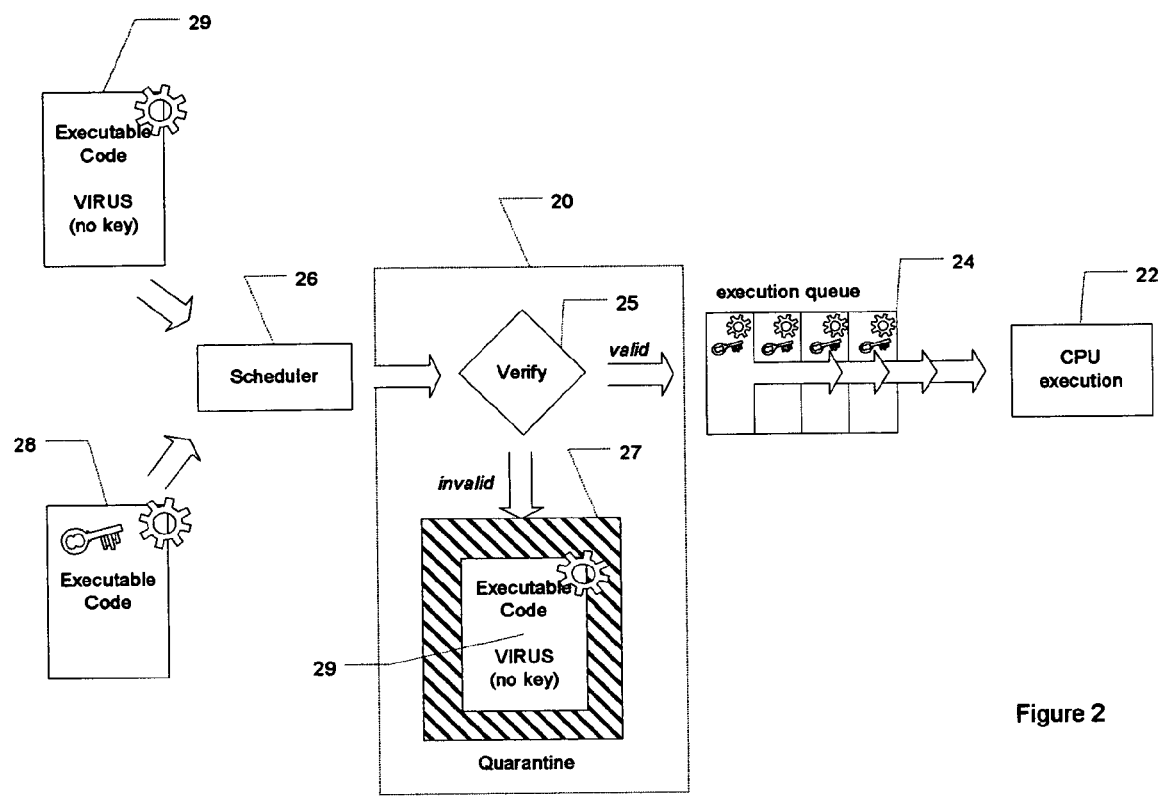
FIG. 2. is a block diagram illustrating a computer system that incorporates the invention.

Referring to FIG. 2, a computer operating system is modified so as to include an embodiment of the invention. New key validation functionality 20 provides secure access to computing resources 22. Unlike present day implementations, as shown for example in FIG. 1, the queued applications 24 have been validated by verify unit 25 before given access to the processor 22. This additional functionality 20 is placed between the scheduling processes of the scheduler 26 and the execution queue 24. The new key validation functionality 20 of the invention can also be placed before the scheduler 26. Either ordering would be effective such that any application requesting CPU resources for an executable file 28, 29 will be verified as valid (or invalid), i.e., having a valid key or not, before being allowed to perform any action due to file execution by the CPU 22. If an executable file does not have a valid key 29, then the executable file will not gain access to the CPU 22, and will consequently not cause any action to be performed by the CPU 22.

When a request is made to use computing resources 22, scheduling information, including an execution key, is obtained from the executable file 28,29, which execution key is verified by the verify unit 25 of the new functionality 20 of the invention. If the execution key is valid, normal queuing for resources is resumed, and the executable file 28 is allowed access to the CPU 22. If the execution key is invalid, the executable file 29 is handed to the quarantine logic 27 for proper processing.

Figure 3:
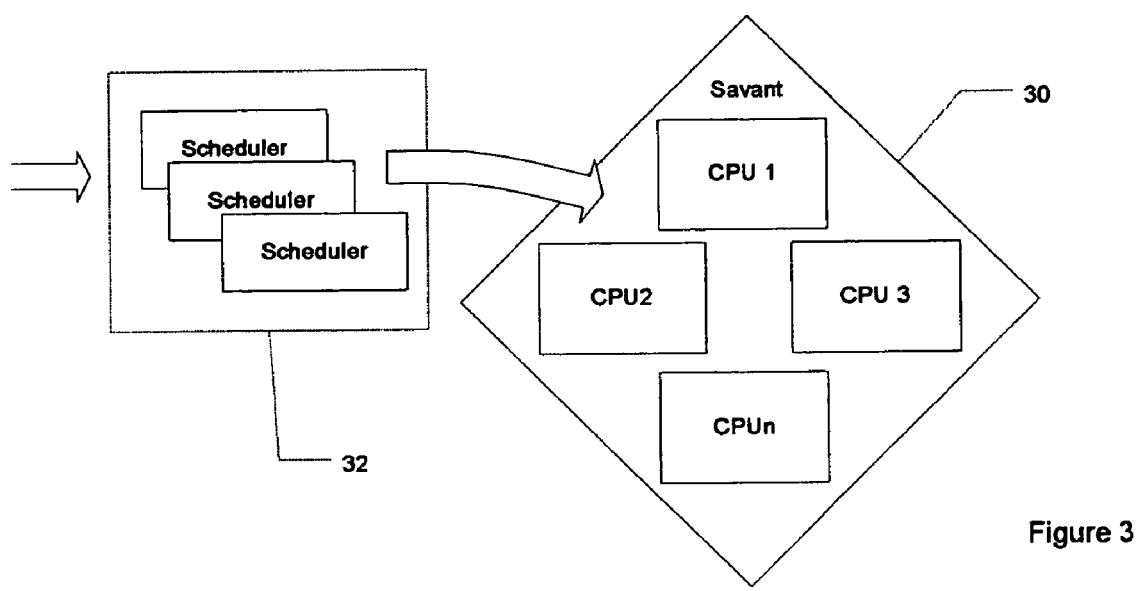
FIG. 3. is a block diagram showing how the invention can be scaled to systems consisting of more than one CPU.

With reference to FIG. 3, the invention can be adapted for use in a multiprocessor environment (e.g., CPU1, CPU2, CPU3, . . . , CPUn) by interposing the new functionality 30 of the invention between the multiprocessors CPU(1-n), and a plurality of schedulers 32. In analogy to FIG. 2, the new functionality 30 includes a plurality of verify units (not shown) to verify the validity of the executable files that are provided by a plurality of respective schedulers 32. Regardless of the number of processors that a solution might require, the invention can be scaled so as to secure each processor against invalid executable files. Whether the system is a synchronous or asynchronous multiprocessor system, each computing resource will work from scheduled queues. These queues are enhanced by including verification logic to ensure that only verified executable files having a validated key can gain access to one of the CPUs of the multiprocessor, thereby providing a computing environment that is secure against malicious or otherwise unauthorized code, irrespective of computing complexity, communication connectivity, and source of applications.

Figure 4:
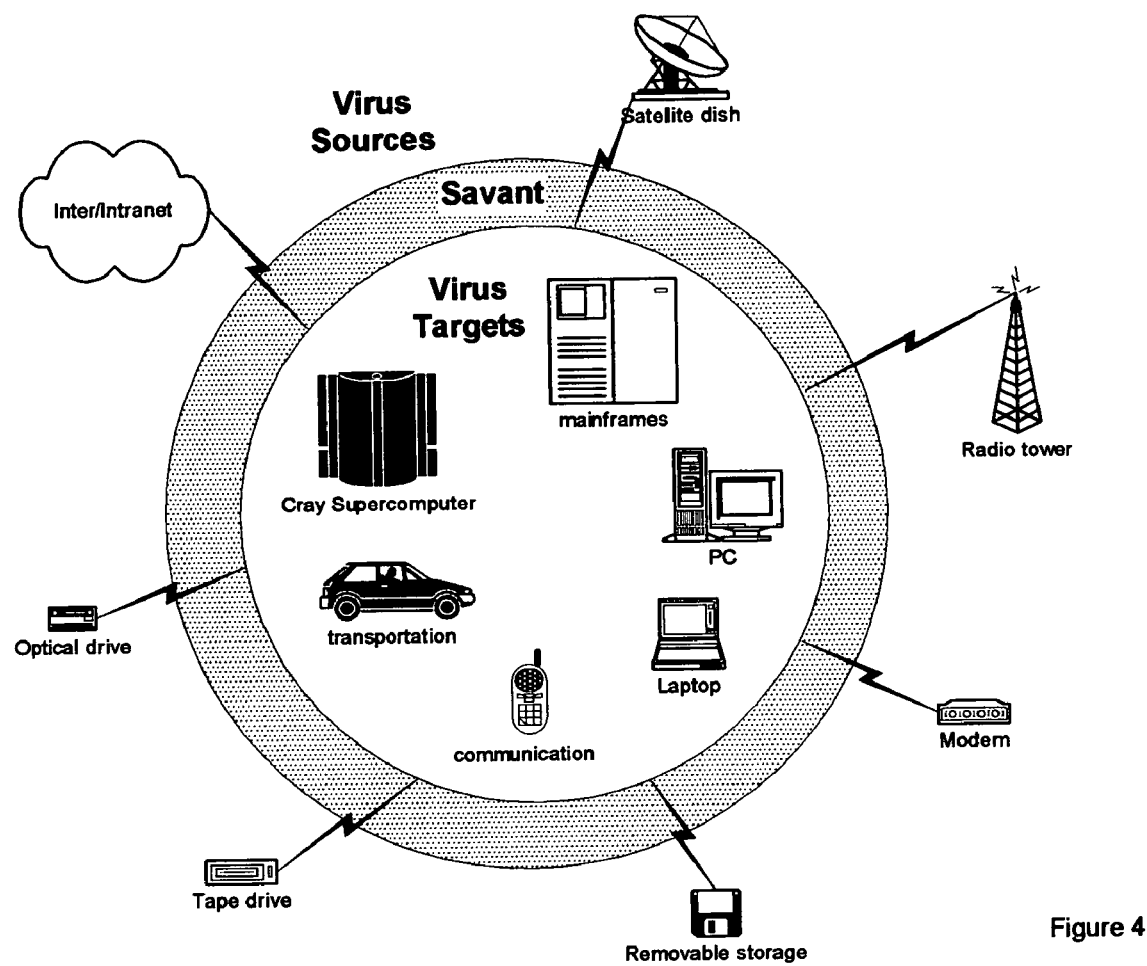
FIG. 4. is a pictorial representation showing possible sources and targets of computer viruses.

Referring to FIG. 4, a plurality of computer virus sources, and computer virus targets is shown. It is important to understand the full variety of potential virus sources, and the systems which are targeted for infected by viruses originating from the many sources shown. Of course, there are other virus sources not shown, and many more such virus sources will emerge in the future. Present day thinking tends to emphasize discussion of computer viruses on personal computers and Internet-attached systems. While this is currently the major focus for hackers, the creation of intelligent internet-connected appliances and machinery, in the home and in industry, is creating new opportunities for hackers beyond the realm of PCs.

Further, the assumption that viruses are only Internet-born is faulty. Early computer viruses were frequently passed via storage media, such as floppies, tapes, etc. In the future, computer viruses will be more commonly transmitted PDA-to-PDA, car-to-car, or cellphone-to-cellphone. For example, on Jun. 18, 2004 the first cell phone virus was reported. The invention is applicable to all devices which have the ability to be programmed with multiple applications. For example, cell phones can now download applications, such as games. The emerging ability to load new, potentially dangerous applications on a non-secure cell phone raises new levels of concern when considering how many of these devices have or will have remote office access capability. Virtual Private Networking provides direct access from any remote device through the firewall of a corporate network, thereby gaining access to the heart of an internal corporate network. This provides a clear path for a virus to gain access to apparently secured resources. These are just a few examples of how a consumer electronic device, such as a cell phone, might infect other systems. There are numerous other ways, outside of taking advantage of VPN tunnels, through which a hacker/virus might choose to get around other security solutions.

Incorporating the invention in a computing device will ensure that only applications that the user wants to execute are able to execute, and that the applications will remain executable in the future, unaffected by malicious viruses.

Figure 5:
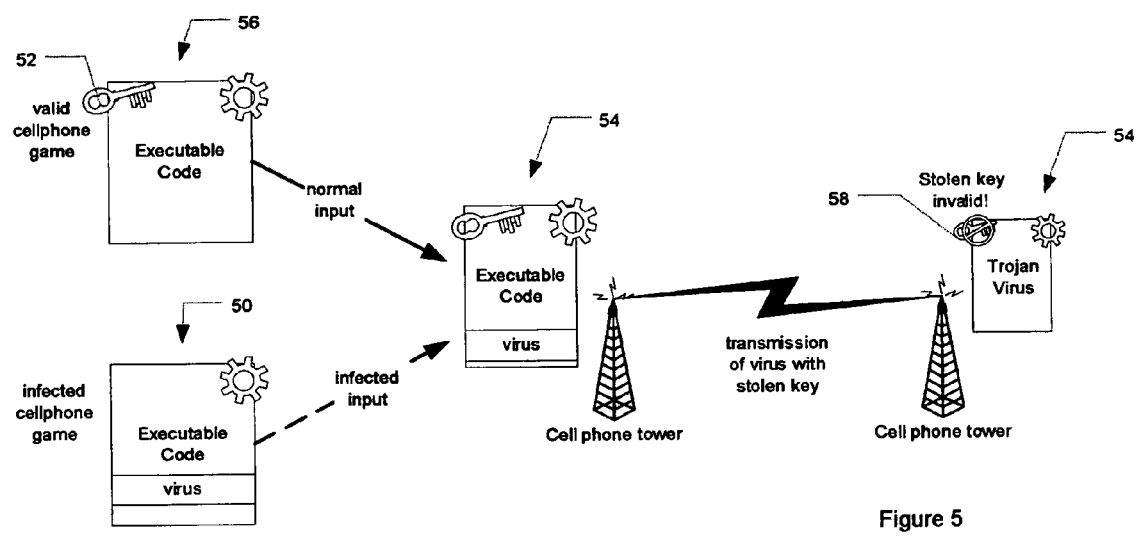
FIG. 5. is a block diagram that provides a graphical example of detecting and blocking a Trojan virus.

Additionally, the potential for spread of a malicious application will be eliminated. FIG. 5 diagrammatically shows that even if a virus-laden application 50 were mistakenly allowed to execute because it somehow was combined with a valid execution key 52 (called a "Trojan virus" 54), the execution key 52 that worked at the source system would not be valid at the target system(s). To illustrate this concept, in the case of a cellphone game 56, a virus downloaded from the Internet 50 and run on the cellphone, will not be valid on another cellphone 58. The invention can defeat Trojan virus attacks on any new application running on any type of computing device, including, but not limited to, transportation vehicles, computers, household appliances, and communications devices, for example.

The invention allows a user to load any desired executable file onto a computing system, but requires that a key be associated with the executable file for the file to run. In the case of the cellphone, if a user were to download a new game, when the time came to play this game, the invention would check for a valid execution key associated with the game, and if a valid execution key were found, the game would run. If no key was found, or if an invalid key was found, the game would not run.

Figure 6:
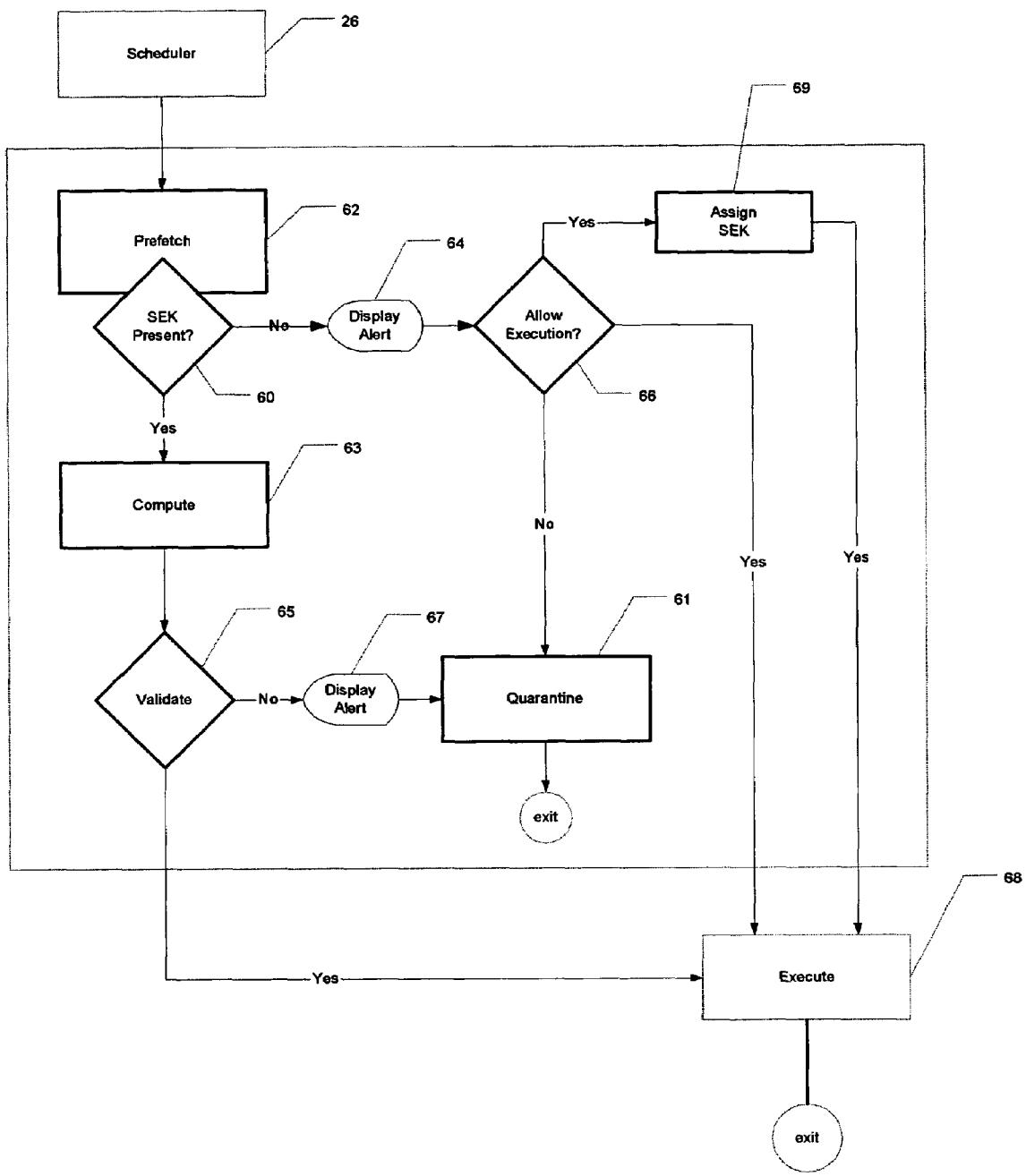
FIG. 6. is a flow diagram depicting a top-level view of the steps of an embodiment of the invention.

If the new game is installed by a user, the invention intervenes during the installation process (generally shown in FIG. 13, further discussed below) to ask whether the new application (the game) is to be assigned a valid execution key. Referring to FIG. 6, if an application, such as a game, has been pre-installed without an execution key, when the application is first queued for execution by the scheduler 26, the invention determines 60 whether an execution key is present that is associated with the application as part of a prefetch operation 62, and then if no key is present, intervenes to alert 64 the user of the pending execution of a non-keyed file. In the case where implicit keying is used, for example, by using encryption that can only be decrypted with a valid execution key (VEK), if the executable file does not decrypt successfully, the user is alerted accordingly 64.

At the time of the alert 64, the user must decide 66 either to allow execution of the non-keyed file 68, or to authorize the assignment 69 of a valid execution key to the file and then allow execution 68, or quarantine 61 the non-keyed file. In this manner, any program requesting use of the CPU will be investigated by the invention, whether intentionally or unintentionally loaded onto a computing system. Thus, no unknown or hidden applications can run on the system without the awareness of the user.

For example, the method of the invention would have been instrumental in stopping the Sasser virus which spread throughout the globe in early 2004. The Sasser virus took advantage of an open networking port to gain access to many computer systems, to then load a virus file onto each of the computer systems, then to covertly execute the virus file so as to replicate itself, and then continue to spread without any awareness of the computer owner or user. If the invention had been installed on each of the computer systems, the Sasser virus would have been quarantined, since it did not have a valid execution key. Even if mistakenly assigned an execution key and allowed to run by one or two users, the execution key, being unique to the infected system, would not have been valid on any other system, and so spreading to another system would have resulted in quarantine, thereby avoiding execution, and preventing further viral spread.

The ineffective approach of most antivirus solutions is to assume all files on a computer system, including data files as well as executable files, are infected. However, viruses are executable files, not data files. In reality, while any file on a computer system can carry a virus, the virus must gain access to the CPU of the computer system as part of an executable file before an active infection of the computer system can occur. The invention efficiently protects computer systems from viruses by only verifying executable files, since only an executable file can be a virus. Thus, the invention is highly efficient as compared with known antivirus strategies, because most of the files on a computing system are data files, and such data files can therefore be ignored. This is because data files are used merely as input and output for executable files, and so data files (e.g., text files, spreadsheets, graphics, databases, etc.) pose no threat by themselves.

In some cases, viruses have been attached to image files in hopes of fooling the user, but the invention is adapted to defeat this ruse. The virus tries to trick the valid application into creating a child application (also referred to as forking), commonly known as a Trojan virus (shown in FIG. 5 at element 54), which runs instead of or in addition to the valid application. In conventional computer systems, if this child process truly is a virus, it will continue to spread, spawning additional children. This is one of the most common techniques employed when spreading email viruses. All virus strategies, whether they attack memory issues (buffer overflows), or look for open services (port scans), ultimately have to include gaining access to computing resources (e.g., the CPU) so that the virus can spread.

Another example is the Netsky virus, which attaches itself to email messages and then tries to fool the email user into executing the attachment. Clicking on the email attachment would queue the Netsky virus for execution by the CPU, but the invention would not allow the Netsky virus to execute because it would not contain a valid execution key. According to the invention, the email user would immediately be notified 64, and be given the choice 66 of how to handle the unauthorized execution request, as shown in FIG. 6.

The invention achieves a uniquely high level of security in part by securely controlling access to the computing resources (e.g., the CPU) of a computer system. Access to other computing resources of a computing system could also be controlled by the invention, alone or in combination with the CPU. Presently, a hacker assumes that if a virus can get onto a computer system, access to the CPU is assured. Knowing this, the hacker tries to trick as many users as possible into accepting the virus, leveraging the large numbers of computing systems to virtually guarantee at least limited success. Thus, the essential assumption on the part of the hacker is unchallenged CPU access. It is this assumption that is challenged by the invention.

The invention provides logic that withholds access to the CPU when such access is requested by a virus. An embodiment of the logic is presented in FIG. 6. This logic is broken down into four primary acts: Prefetch 62, Compute 63, Validate 65, and Quarantine 61.

In all operating systems, once an application has requested use of the CPU, it is scheduled for execution by a scheduler 26. In a preferred embodiment, the invention then attempts to validate 65 a key associated with the application, and then execute 68 the application using the following detailed logic, with reference to FIGS. 6 and 7:

```
If the queued application contains a stored execution key
    (SEK) 60
Then
    Retrieve the stored execution key 70
    Retrieve the associated valid execution key from the key
        store 72
    If the two keys match 65
        Then
            Allow the application to execute 68
        Else
            Alert 67 the system user of invalid key
            Quarantine the application 61
Else
    Alert 64 the system user that an execution key is not
        present
    Request permission 66 to execute the application
    If permission is denied
        Then
            Quarantine the application 61
        Else
            Either assign a key 69, and then Execute the appli-
                cation 68, or just Execute the application 68.
```

Note that additional subtleties and variations can be added to this logic at the discretion of the programmer, depending on the key implementation chosen. Some additional implementation considerations include:

- When the invention detects an invalid or missing execution key, but the end user permits execution anyways, the end user might also grant permission to provide 69 the application with an execution key for future use, or only allow one-time execution.
- Depending upon the keying algorithm used, the execution key can be derived from the contents of the file, and therefore not require comparison to another key. Certain keying techniques can allow for validation of the key based upon it explicit value or format (e.g., CRC checks, bit locations, etc.)
- Depending upon the configuration of the quarantine process, the end user might be asked to provide approval prior to quarantine of an application with a non-valid key, and in the absence of approval, execute the application with a non-valid key.
- If the system is enhanced to provide an execution privilege field (see below), then the invention could also quarantine an application that did not have execution privileges.

Figure 7:
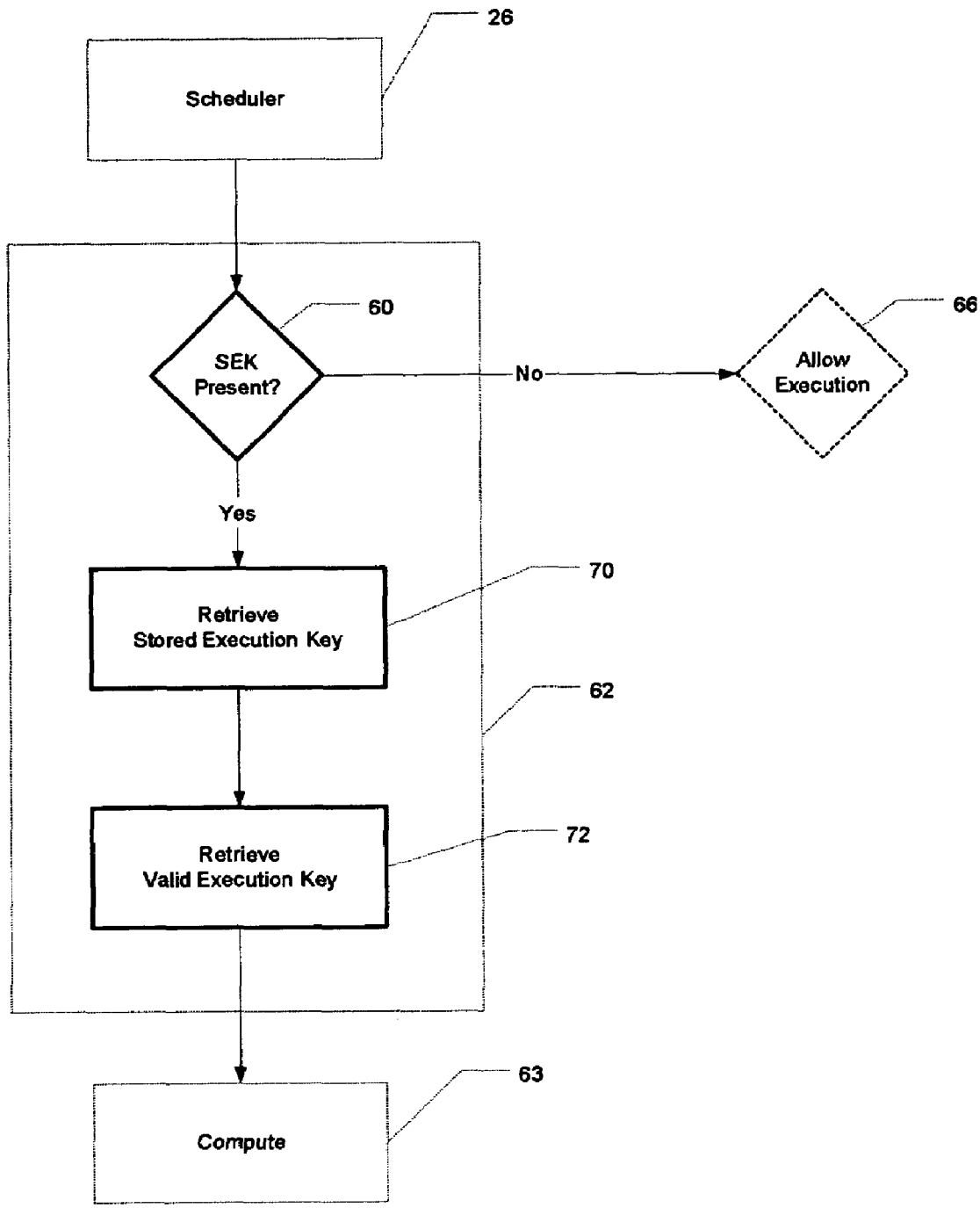
FIG. 7. is a flow diagram depicting the steps of the Prefetch block of FIG. 6.
Figure 9:
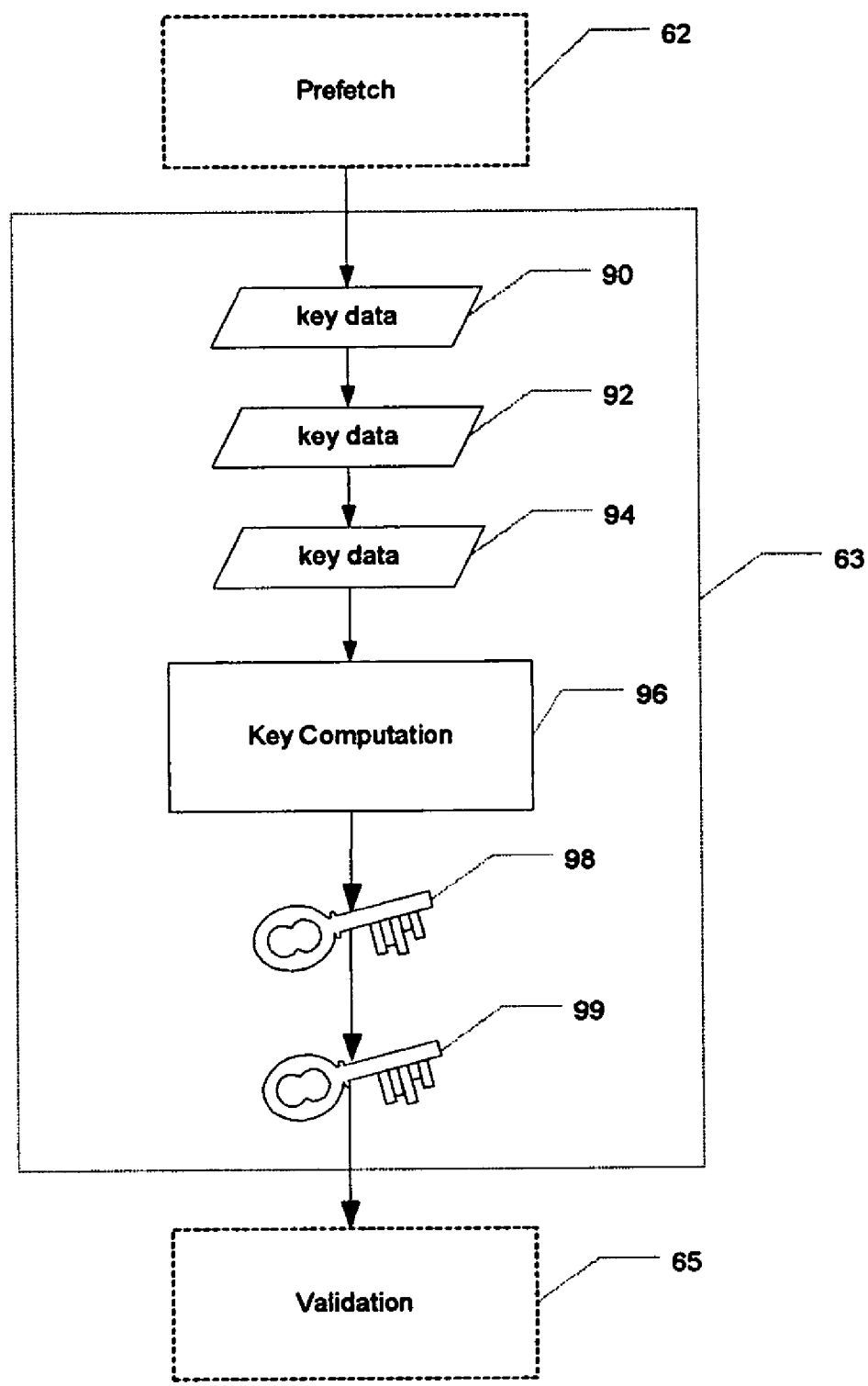
FIG. 9. is a flow diagram showing the logic of the Compute block of FIG. 6.
Figure 10:
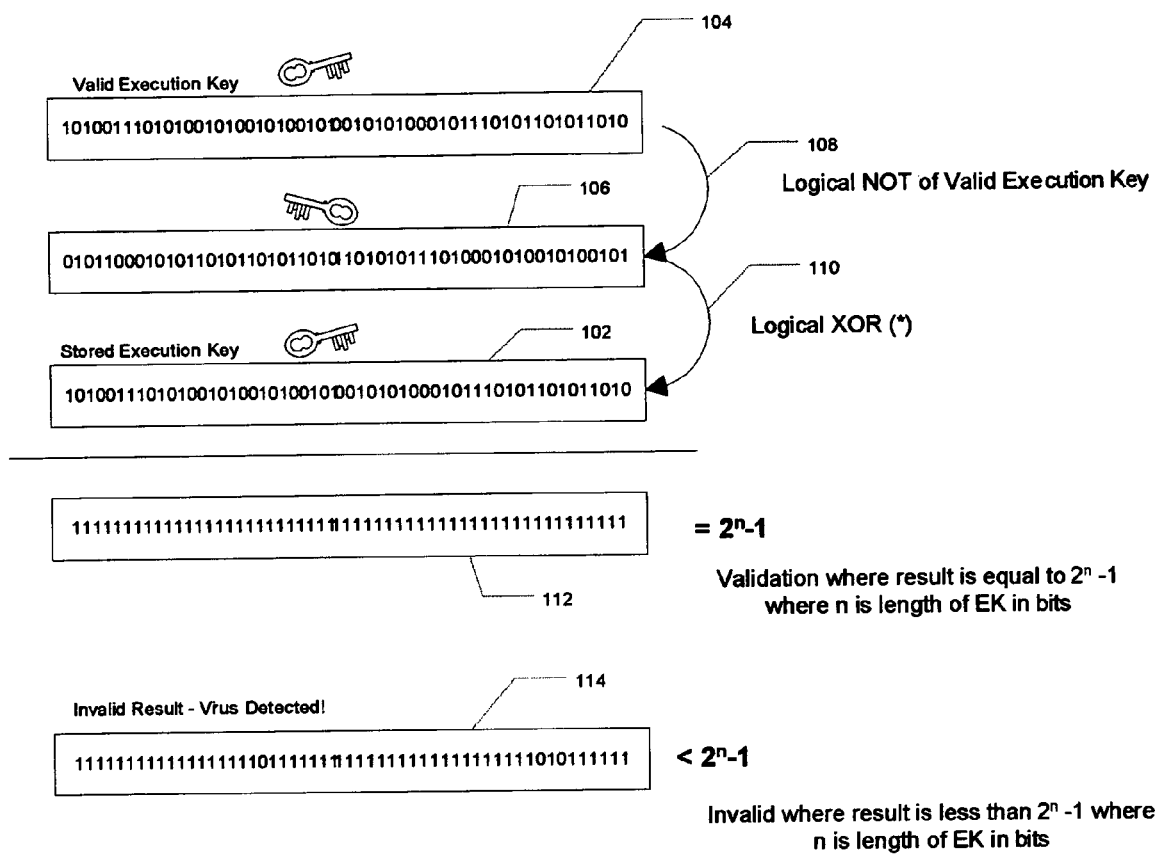
FIG. 10. is a graphical representation of the details of the use of XOR logic in the Validation block of FIG. 6.

The Prefetch operation 62 detailed in FIG. 7 is responsible for retrieving all the data 90, 92, 94 of FIG. 9 necessary to compare the Stored Execution Key (SEK) with the Valid Execution Key (VEK) in the Validation operation 65 detailed in FIG. 10. This information is provided to the Compute operation 63 which, if required, computes 96 the value of any key 98, 99 so as to provide its final format, as detailed in FIG. 9. The final format of the SEK 98 and VEK 99 are then passed to the Validation process 65 as shown in FIG. 6 which determines whether the application can actually use the CPU 68 or be quarantined 61.

Prefetch 62, as shown in detail in FIG. 7, is responsible for acquiring all the data needed to validate the stored execution key (SEK). The type, amount and location of the key information can be completely customized depending upon the OS and key algorithm. For the sake of this explanation, a simple key comparison scenario will be used, the assumption being the SEK is located in the header of the application, and the VEK is located in a secure database on the computing system.

First the Prefetch operation 62 retrieves 70 the SEK from the queued application. Depending upon the key implementation, this might be found anywhere in the program file—header, body or tail, as shown in FIG. 8E. The most likely location would be in the header of the file, as this is easily and quickly retrieved in most Operating Systems. If the SEK is not present 60, one of two actions can be taken; the user may elect to allow execution 68 or request quarantine 61. As previously discussed, there may be occasions where an application is simply added to the storage facility of a device and not formally installed. In this case, the first time the application is run, the invention will detect 60 the absence of an SEK, and alert 64 the user. The user may then elect to have the application run once 66, or have the invention provide the application with an SEK 69 for present and future use. If the application was installed, during installation the invention will typically key all necessary files so that future use of the program is valid and requires no intervention.

It is important for the implementer to note that, depending upon the keying solution used, the Prefetch 62 operation may actually be retrieving data 90, 92, 94 used to compute 96 the keys, and not the complete keys 98, 99 themselves. The most direct scenario would be to simply retrieve both keys 98, 99 and compare them, effectively skipping the Compute 63 operation that follows the Prefetch operation 62. In other cases, for example when using Arithmetic Mutation keys, the VEK is actually computed using a number of data points 90, 92 and an arithmetic equation 94. In this case, Prefetch would retrieve the SEK, and collect all of the necessary data for the Compute 63 operation to provide the VEK.

FIGS. 8A, 8B, 8C, and 8D provide various examples of possible keying schemes for a header or a tail of an executable file as shown in FIG. 8E, which shows a graphical depiction of a file having a header 802, contents 804, and a tail 806.

Figure 8A:
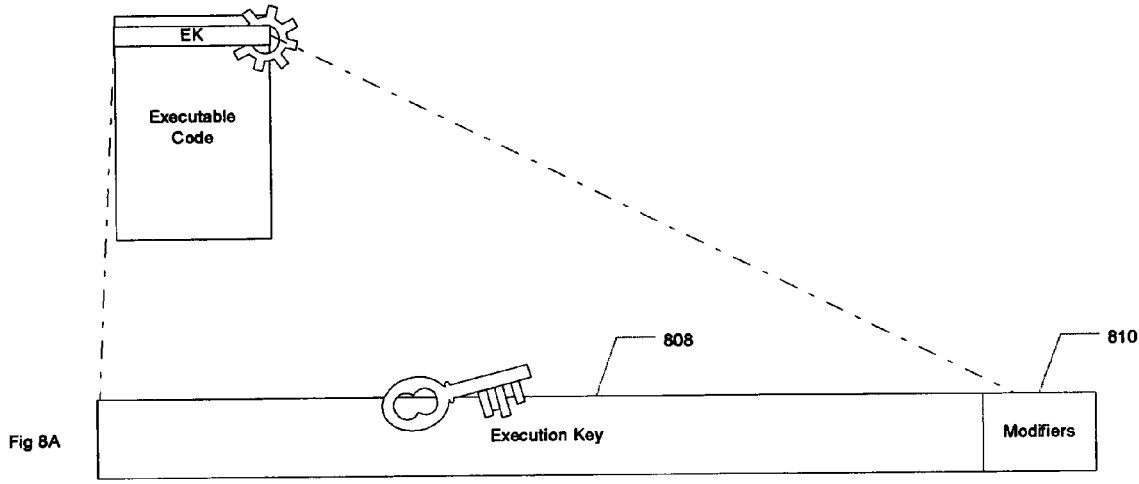
FIGS. 8A-8E. include graphical depictions that illustrate various approaches to formulation and placement of the execution key in the header of the executable file, and a graphical depiction of the organization of a file having a header, file content, and a tail.

FIG. 8A shows the placement of a pure stored execution key (SEK) 808 in the header portion of an executable file, with a Modifier field 810 attached. The Modifier field 810 is a bit mask used to provide a variety of functions. Bits in this bit mask can be used to denote scripts, restrict re-keying, or enable administrative functions. The particular use, length, and configuration of this field is specific to the requirements of the operating system used (e.g., PalmOS®, or Windows XP®) but certain examples will be provided throughout this document.

Figure 8B:
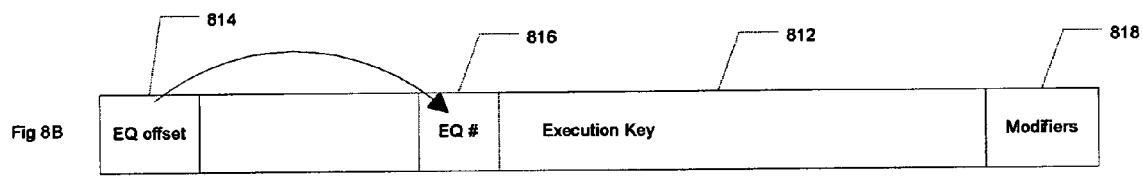

FIG. 8B is an example of a stored execution key (SEK) 812 which contains two additional fields 814, 816, one being an offset value 814, and the other being a equation number 816. A modifier field 818 is also included. This is an example of how one might specify the arithmetic equation used when implementing an Arithmetic Mutative key scheme. The equation number 816 would be used by the Prefetch 62 operation to retrieve the related equation used to calculate the valid execution key (VEK) in the Compute 63 module.

Figure 8C:
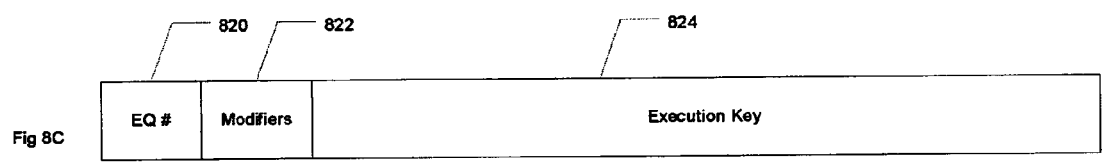

The use of an offset 814 is optional, as shown in FIG. 8C, where it is not used, including only an equation number 820, modifiers 822, and a stored execution key (SEK) 824.

Figure 8D:
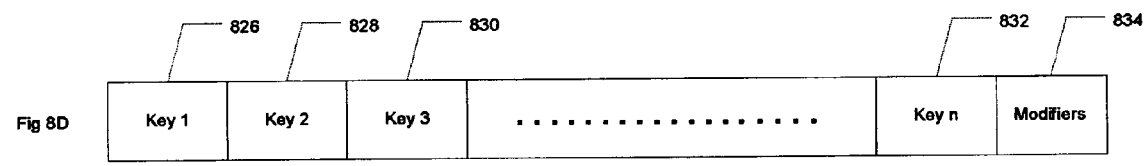
Figure 8E:
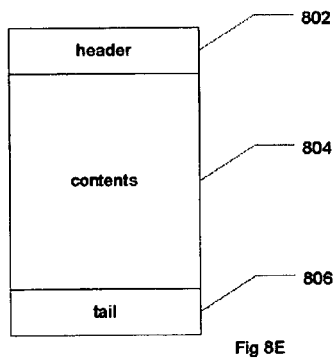

FIG. 8D depicts the use of multiple keys 826, 828, 830, 832, and modifiers, all stored in the header or in the tail, for use in a multi-user system, where the OS might require a separate key for each user.

FIG. 8E is provided to illustrate the concepts of file header 802, content 804 and tail 806. The way in which this is implemented varies greatly, for example, as in Microsoft's FAT32 and NTFS.

Once the Prefetch 62 operation has gathered all necessary information, should any of the keys require additional work before being validated; the Compute operation 63, as detailed in FIG. 9, will perform the necessary functions. In general, the Compute 63 operation prepares any and all keys prior to comparison or validation. Obviously, different keying scenarios require more or less prepration. If, for example, a Public/Private key scheme were chosen, the Compute 63 logic would act as the Public key store with the application, and as a key store holding private keys. If an Arithmetic Mutation were used, the Compute logic would compute the VEK using the data point and arithmetic equation provided by the Prefetch 62 operation. What the Compute 63 logic does not do is perform the actual validation of the application. It is important that the Prefetch 62, Compute 63, Validate 65, and Quarantine 61 logic stay compartmentalized to allow for flexibility in and changes to the implementation as required. For example, moving a system from a Linux ext2fs to an NTFS files system would require changes in the Prefetch 62 operation, but might not require recoding Compute 63 and Validation 65 functions. Clearly, any or all of these operations could be combined. The invention would function as a monolithic application or object oriented program as presented herein. The logic does not necessarily dictate the programming paradigm.

Once all keys are retrieved and calculated, the critical element of key validation 65 takes place. This stage of the logic of the invention determines whether an application actually gets access to the CPU. The particular implementation of Validation 65 is a function of the keying scheme used, of which there are many on the market.

Referring to FIG. 10, in almost all cases, the final decision, from a computing standpoint, comes down to the comparison of keys using basic computing techniques. The Validation 65 logic takes as input at least one stored execution key (SEK) 102 and one valid execution key (VEK) 104, represented in binary arithmetic as a bit mask—a series of ones and zeros. The fastest and most exacting means of assessing whether the two keys are exactly the same is to apply a sequence of Boolean logic operations, as shown in FIG. 10.

First, the inverse 106 of the VEK 104 is taken using a Boolean logic NOT function 108. This NOT function 108 turns all 1's in the VEK to 0's, and all 0's in the VEK to 1's—essentially a negative binary image of the VEK. This result is then logically XOR'd 110 with the Stored Execution Key (SEK) 102. An XOR operation will result in a 1 only if either of the two bits are a 1. If both XOR'd bits are 0 or 1, the result is 0.
1 XOR 0 or 0 XOR 1=1
1 XOR 1 or 0 XOR 0=0

The binary result 112 of the XOR operation 110 should be $2^n-1$ if the keys are identical, where n is the number of bits of the execution key. For example, if the key was 8 bits long, the XOR operation of two identical keys (VEK and SEK) would be $2^8-1$, i.e., 255. If the keys do not match, the result 114 would be less than $2^n-1$. If the result 114 is less than $2^n-1$, the keys are not identical, and therefore the application associated with the key is assumed to be a virus or otherwise malicious and/or unauthorized code. The application is then handed to the Quarantine logic 61, and not onto the CPU for execution 68. The Validation logic 65 is summarized as:
Result=NOT (VEK) XOR SEK
If Result=$2^n-1$ then
    Application is executed
Else
    Application is handed to Quarantine logic.

Note: The length of the key (n) is flexible and can be determined by the implementer according to the level of security desired—longer keys provide greater security.

This example illustrates the most direct method of key validation, i.e., one key compared to another. There are many other useful key validation methods which use similar logic, possibly involving the comparison of bit masks, verification of bit locations, or bit validation schemes (such as cyclical redundancy checking (CRC)) so as assure valid execution keys, and therefore authorized execution of executable code, according to the invention.

In addition to validation of keys, the Validation process 65, and detailed in FIG. 10, is responsible for key consistency, thereby allowing a programmer to change keys after validation. For example, in cases where the user wishes to create a higher level of key security, the Validation logic 65, after validating keys, can upgrade the SEK and VEK with new binary values, thereby reducing the likelihood that keys will be stolen or derived by virus software. This is achieved by storing a new SEK in the application file, and updating a "key store" with a new VEK. The term "key store" is a term for the validation key database used in the particular key scheme. The record format of this database and how it is stored will vary in accordance with the key scheme used. For example, when an Arithmetic Mutative key is used, the Key Store (KS) actually contains only arithmetic equations which are used to compute the VEK. If a Public/Private key scheme were used, the SKS might contain Private keys indexed by application. Once the application has been validated (and optionally, keys have been updated), the verified application will be granted access to the processing resources 68. Alternatively, an invalid application file will be subject to the quarantine process 61 and the rules it has been configured to apply.

Figure 11:
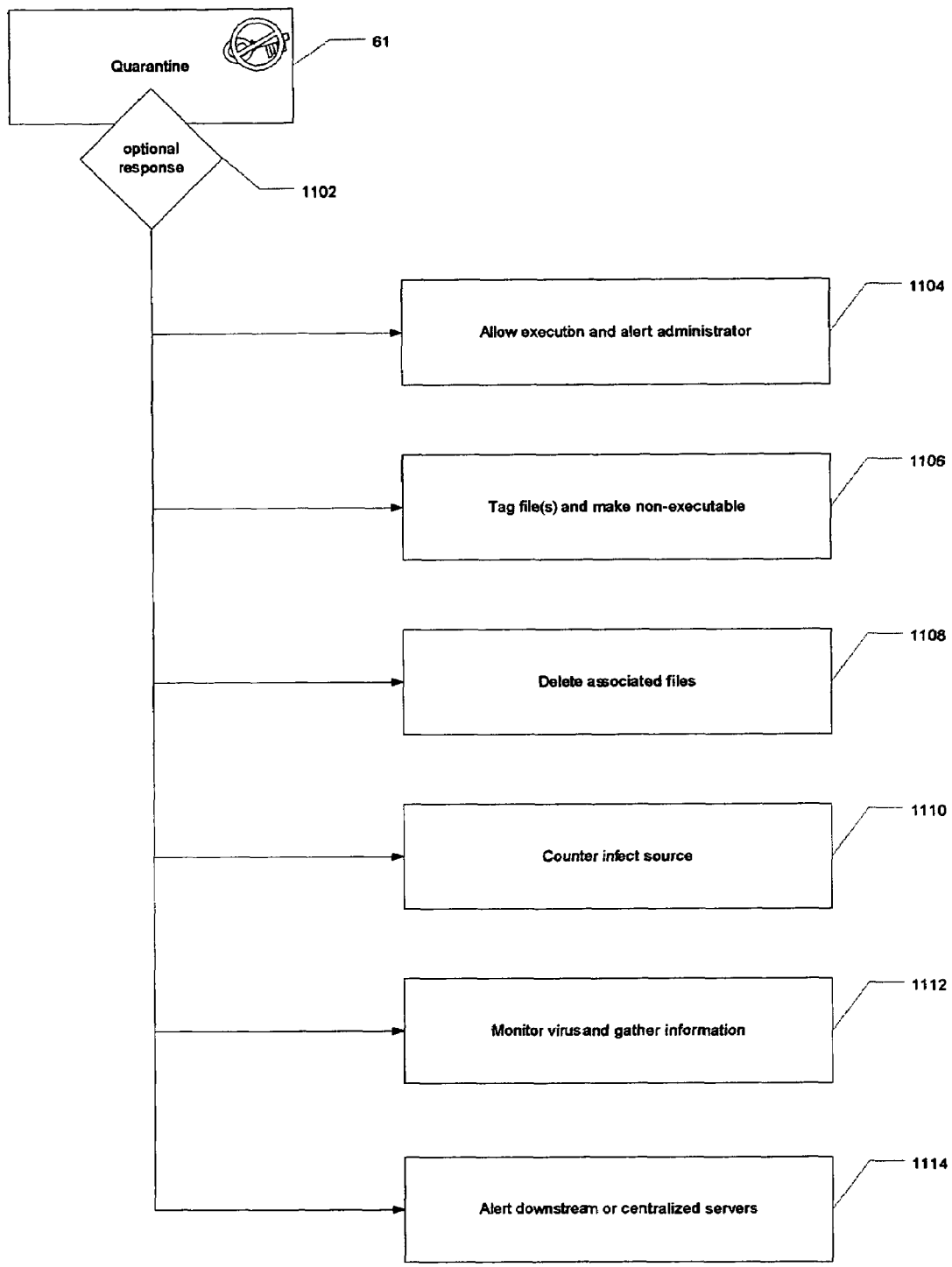
FIG. 11. is a flow diagram showing the possible actions associated with the quarantine block of FIG. 6.

The Quarantine logic 61, portrayed in detail in FIG. 11, can perform any number of potential actions as a result of being alerted to malicious code, and is not limited to those shown in the diagram. Potential actions the Quarantine logic 61 performs when presented with an unauthenticated application file (potentially malicious code) can include:

Tag the application file as "bad", and modify the application so that it cannot execute the future Delete the application and associated files Attempt to determine the source of the infection, and use that information to counter-infect the source Allow the application to execute, while monitoring execution progress to gather information Move the file to a quarantine store, and alert all other systems enabled with the invention Move the file to a quarantine store, and alert a centralized authority.

Alert the system administrator and allow execution despite suspicion

The Quarantine logic 61 is adapted to give the system administrator a wide array of choices in how to react to the discovery of malicious applications. Such choices can be offered to the user and/or administrator in real time as unauthorized executable files are detected by the invention or a pre-selected course of action can be carried out by the computer system that incorporates the invention. Quarantine operations should be flexible, allowing the administrator to design the require response. In certain cases, it is advantageous not to stop a virus from executing. The system can be isolated, and then monitored to better understand how the virus acts.

Operating System Modifications in Support of the Invention

In addition to the core functions of the invention, modifications to the Operating and file system are made to further prevent virus applications from undermining the user, and the logic and resources of the invention. Essential to protect are the Stored Execution Keys (SEKs), because these keys are necessary to gain access to the CPU of a computer system to enable execution of unauthorized code, such as viruses. Thus, in a system protected by the invention, the Stored Execution Keys would be a critical target of a virus intended to infect a system.

Below are several enhancements recommended to protect these keys and thereby providing additional system security. The developer should consider including all enhancements so as to create the most secure system possible with the invention:

- Remove the ability of any process to copy SEKs from one file to another.

As a rule, the copying of file headers, or the replacement of portions of executable code, should not be allowed on any system. This is a common tactic for fooling a system into running unauthorized code—a hacker technique called "spoofing".

- Retrieval (reads) of execution keys, whether from the file header or the key store, should only be allowed by function calls of the invention. There is no reason to allow other processes to interact with the keys of the invention, and therefore function calls of the invention should not be exposed in any form. All functions of the invention should be self-contained, and not programmed into a shared library or accessible to users.

- Writing execution keys to file headers, or to the key store, should only be possible for function calls of the invention. Similar to reading keys, write functions of the invention should only be used in the context of the invention. These write functions should not be used external to the invention, nor be available for other programming efforts unrelated to the invention.

- Add execution file privileges to applications and their supporting files. Like Unix file systems, all operating systems should provide executable files with execution privileges, including supporting code libraries and object files. This will allow a system enhanced by incorporating the invention to better intercept malicious applications by not allowing execution of files without execution file privileges.

- Require forked applications to reenter the scheduling queue and/or be validated by the invention. Child applications (i.e., those created by a parent process, hence forked) should not be given automatic access to the CPU. They should be subject to the same validation process as the parent so as not to allow Trojan viruses. The validation of a parent application does not extend to any spawned child applications.

- Secure the key store (KS) on both disk and in memory. The key store (KS) maintains the Valid Execution Keys for the system of the invention. While the format of this store will change based upon key implementation, care should be taken to make sure it is secure on all storage media and in memory. No applications other than the invention should be able to access, copy, or modify the key store.

- Use a unique process identification and privilege level for the invention. By providing the invention with a unique process ID (PID) and privilege level, other applications which might try to act on behalf of the invention will be deterred. They will not have the required PID or privileges to perform malicious functions, even if access to these functions is achieved.

By applying these additional measures with the invention, computing systems will gain a considerable measure of security by preventing applications from running on computing systems without prior or explicit approval.

Implementation of the Key Store (KS)

The Key Store (KS) serves as the secure repository for the Valid Execution Keys on each system. It is the database which holds the fields against which the Stored Execution Key (SEK) associated with each authorized application is verified by the invention before giving the application access to the CPU. The implementation of this database is extensible, and can be modified to fit the needs of any operating system.

Given the inherent flexibility of the key system of the invention, it is not necessary to force strict guidelines on the structure of the key store, but certain considerations should be taken into account when implementing the key store:

First and foremost, the key store should be designed to provide speed and security. Speed is especially important during the boot process of any larger computing system, as each application during the boot process will require validation. Thus, it is most likely that the key store will be read into memory, and a hash index created for quick key retrieval. This need not include all fields, but can be limited to simply the application name and VEK. The hash table can be created using the application name, and will have negligible system resource impact. Care must be taken to make sure the memory space is not allocated from user space, and only within kernel memory regions. This will help avoid buffer overflow attempts to gain access to the key store while in memory.

The key store itself can be fairly succinct, maintaining only the information required to properly retrieve and match keys. A typical record format for the key store might be similar to:

```
Struct keystore
    aname    : char(256) ; application name/pointer, full, relative or qualified path.
    vek      : integer   ; valid execution key
    expire   : date      ; expiration date of vek for automated rekeying
    lmod     : date      ; last date of vek modification
    crc      : integer   ; CRC values for header only (optional)
```

Depending upon the file system and OS, some of the field values may change. For example, the aname field in a Linux system might be the inode instead of the application name. Storing the complete path of an application in the aname field would also limit the location and movement of applications as moving it to another location (e.g., to another directory) would invalidate the key store entry. Storing the complete path provides additional security against spoofing.

The "vek" field is used to validate the stored execution key (SEK), and may take on one of a variety of formats, depending upon the keying scheme. The "expire" field is used to provide the ability to automatically rekey applications at requested intervals; to deter hackers from stealing the key database, the administrator may want to regularly change the keys. Setting the keys to expire facilitates additional key diversity by enabling keys to change at unknown intervals. The "lmod" field is used to track when this record was last modified. This will provide a means of determining any unauthorized changes to the key store. The last field, the "crc", is optional and can be used to help validate the key store. The crc (cyclical redundancy check) will be computed against the complete header of the application file. In most systems this, will be fairly static, since application files do not move around often. This is a good way to detect changes to the application header without too much of a computing resource impact. Performing a CRC check on the complete file is inadvisable, as it will take additional compute cycles, and force the complete file to be read into memory, thereby creating a greater chance that it could be infected via a buffer overflow virus.

Changes to the values of these fields should only be made by functions of the invention so as to protect against security issues. Likewise, it may be advisable to encrypt the database and/or store it either outside the file system, or in a secure, non-published location.

Management of a Computing System Enhanced with the Invention

Management of a computing system enhanced with the invention includes all the functions necessary to manage the keys and applications;

Installation of new applications

Removal of old applications

Management of quarantine actions

Management of the key store

Rekeying of the system

Reporting and Validation

These functions should be written into a single monolithic application and only accessed from a privileged account with administrative interaction only occurring on the system terminal. It is very important that none of the functions to be specified are accessible from anywhere other than the system console. Many Operating Systems allow for console output and input to be directed over various networking protocols. For computing systems enhanced by the invention, this should never be the case, as it will expose powerful commands to a potential hacker.

To further protect against unauthorized use over a wide number of systems, the management interface should only be used via a graphical user interface (GUI), and only enabled after a validation password is supplied. This interface should never be available from a scripting interface, nor should any of its functions be made available to external applications. By limiting the interface to a local, password protected GUI, anyone hoping to make use of the management interface to infect thousands of systems would have to be able to respond to thousands of systems, a highly impracticable task, and would also completely expose themselves to detection, as the remote console would be easily traceable.

This management interface will allow the administrator to take care of any single or ongoing tasks as they relate to keys of the invention, quarantine handling, and reporting. Of particular importance is the installation and keying of a new application. As previously mentioned, new applications may or may not involve an installation process. For those that do involve an installation process, the system will be called to request a key. For those that do not involve an installation process, the administrator may provide a key through the management interface.

Keys come in two forms, One-Time use and Full-Time use. One-Time Use keys are only provided when a new application, having queued for the CPU, requests an execution key, and the end user authorizes it for one CPU time slot allocation. The key is not stored or used any other time. No record in the key store is created, nor is a key written to the file header. The next execution of this application will require another One-Time Key to run. Full-Time Keys are allocated to the application until revoked, the key store is updated, and the execution key written to the application file. The user may grant this key upon first execution, or use the management interface to grant the key ahead of time.

Similarly, keys may be revoked, also a function provided by the management interface. Revoked keys are removed from the key store and the application file header (or relevant file location). It is up to the implementer to decide whether additional actions, such quarantine, are also provided in this case.

Quarantine actions for the system are also managed by the management interface. As in prior discussion, there are a number of potential responses available to the administrator. Through this interface, the administrator specifies how the system will respond to malicious code on a system-wide basis. It is also feasible for the implementer to provide a mix of quarantine actions at their own discretion. This would require adding additional fields to the key store to manage how each application would be quarantined. New, previously unknown applications would follow global quarantine rules.

General management of the key store may also be advisable. As with all databases, there are cases wherein orphaned records occur. In the case where an application is deleted without removing the key store record, the management interface should allow the administrator to search for orphaned keys, and either reassign them or delete them. The administrator should be provided with a list of choices as to how to handle orphaned keys. There may also be occasions, as a result of use over time, where the key store may benefit from compression, removing any blank or bad records from the key store. This function should also be provided.

Rekeying a system is a particularly dangerous operation because it exposes all applications to potential infection. The administrator should be given the option of rekeying a single application, in cases where a virus might be suspected, or the complete system. Rekeying the complete system should require the uninterrupted use of the whole system until complete. This will disable any other malicious code while the process of rekeying is underway. Obviously this will normally be done either after normal business hours or when sole use of the system is achievable.

Rekeying, for security purposes, should require an administrator to invoke the process by hand, and not queue the event for processing later, e.g., as a night time batch job. Unattended processing provides too much opportunity for malfeasance. Additionally, as a fail safe, computing systems that incorporate the invention should provide recovery media intended to provide the administrator with a means of reactivating the administrative utility if the rekeying should fail. This might take the form of a bootable floppy, CD-ROM, or factory default recovery sequence. This will provide the administrator with an ability to re-enable the system if the keys become corrupt.

The final management task should be that of reporting and validation. The administrator should be able to generate a report showing all keyed applications (not showing actual keys), and be able to validate all keys in order to check system integrity. Validation will consist of matching SEK and VEK for all applications registered in the key store. The result should be a report showing all valid and invalid records in the key store.

All of these functions, combined with proper security access, will ensure proper use and maintenance of a computing system that has been enhanced by incorporating the invention.

The Effect of a Computing System Enhanced with the Invention

Figure 12A:
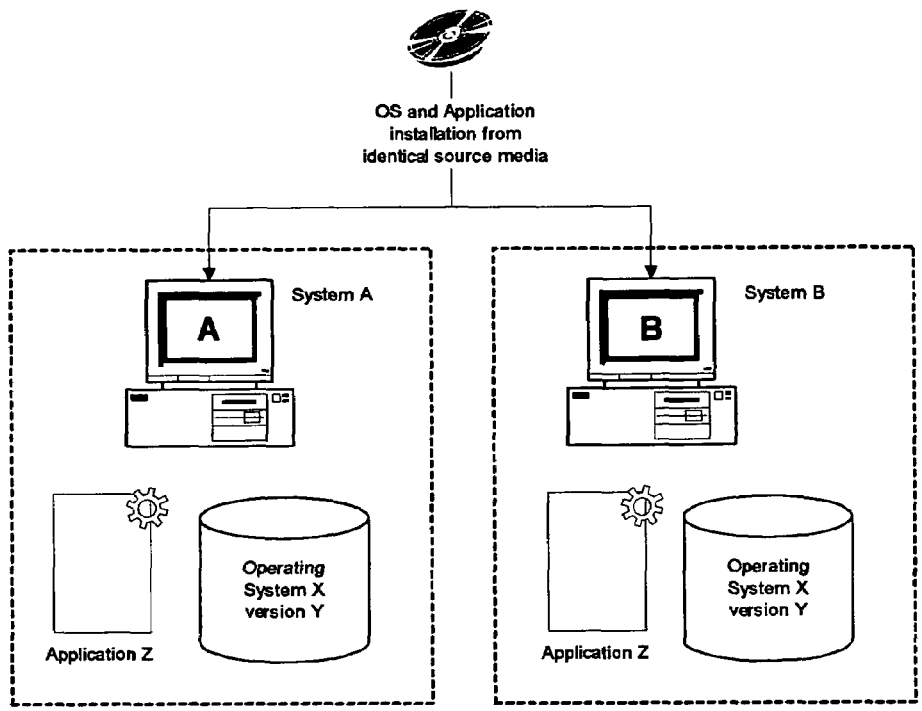
FIGS. 12A and 12B. are block diagrams that compare and contrast a prior art system configuration with a system configuration that includes the invention, particularly illustrating how the invention provides system diversity, despite installation of applications from a single code source.
Figure 12B:
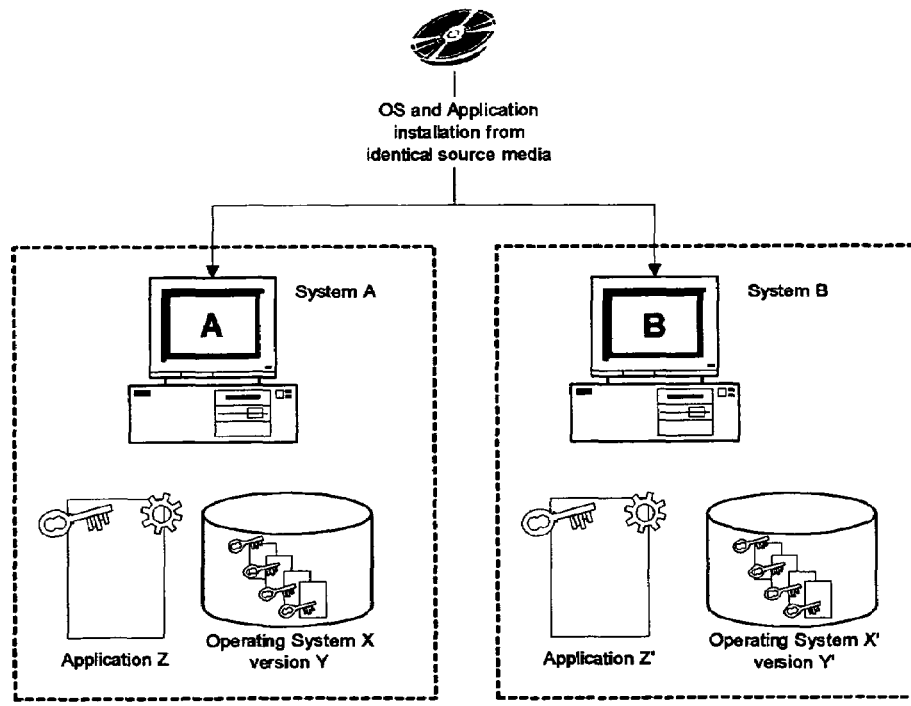

The end result is modification to the operating system software in such a way as to allow software companies to continue to distribute identical media, but nevertheless create a unique, secure system at every installation. As shown in FIGS. 12A (prior art) and 12B (the invention), the invention requires no change in the way software is developed and distributed. The concept of a sole-source for software still holds. The approach of the invention can be applied to all operating systems and all third-party applications installed. According to the invention, software companies do not need to change any aspect of their current software development or distribution.

Figure 13:
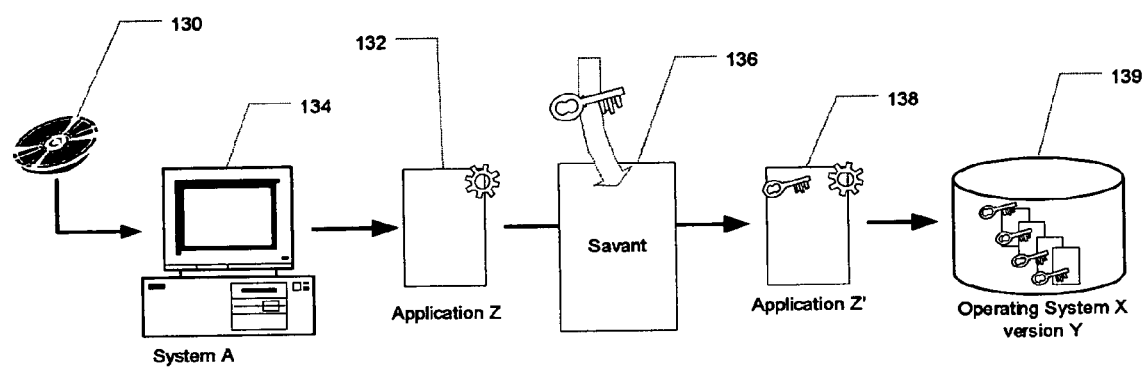
FIG. 13. is a schematic diagram illustrating the process by which an execution key is applied to an application during installation.

Referring to FIG. 13, during installation via a mass-distributed media 130, the installer of an application 132 onto a system 134 will be asked to assign an approved execution key 136, and thereby identify the application as valid 138. The diversity of each system is created by the invention, not the application. The changes are made to the operating system 139 by a small number of vendors, as compared to the number of end-user application vendors. The impact on the cost of development is thereby minimized. The majority of software development firms will not be required to make any investment in R&D to work in a manner consistent with use of the invention.

For the end user or system administrator, a computing system enhanced with the invention provides final control over which application is allowed to run on a system, without limiting choices. This invention also provides the security needed to prevent inadvertently installed viruses to infect other systems.

Figure 14:
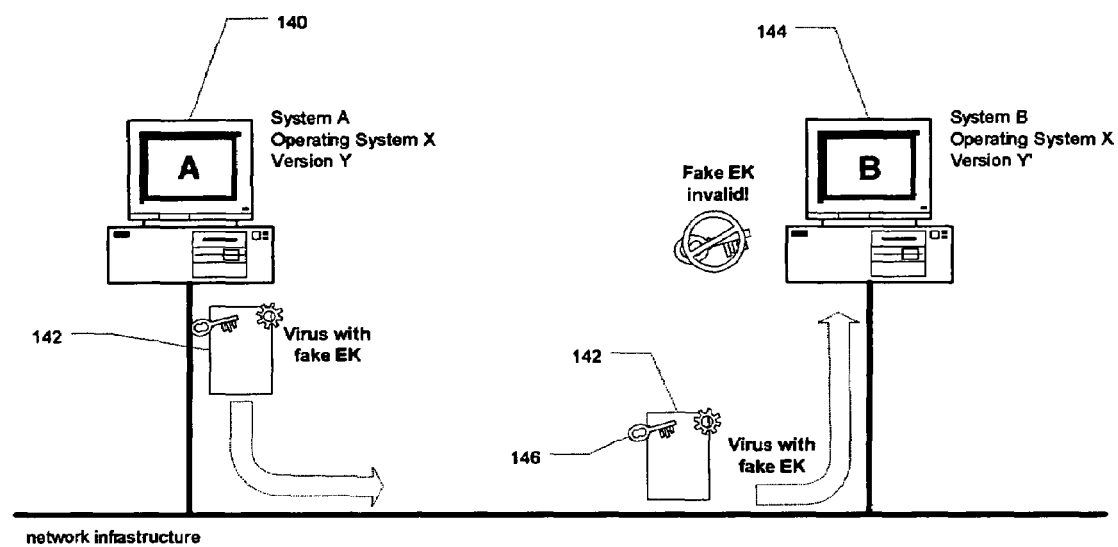
FIG. 14. is a pictorial representation that shows the manner in which the invention prevents infection of a second computing system due to the spread of a computer virus from a first computing system infected by the virus.

As show in FIG. 14, the unique keying and validation of each application according to the invention blocks the spread of viruses. If a user on System A 140 is tricked into allowing a virus to execute on his system, and this virus 142 tries to replicate to another system (System B) 144, the key 146 it carries to System B 144 will not enable execution. Even a faked execution key will not work on other systems. One could literally fill a room with computers all connected together, install them all from the same source CD-ROM, place numerous viruses on a computer, and know the other systems in the same room would be free of virus infection.

To summarize, the invention specifies the following modifications;

Attachment of an execution key to all potentially executable files in a computing system.

Validation of the execution key before allowing an application access to computing resources.

Disallow copying or modification of execution keys by any process other than processes of the invention.

Disallow access to Valid Execution Key Store and/or supporting data by any process other than processes of the invention.

Ability to re-key all executables through a management interface of the invention.

Quarantine capability with the flexibility to tailor a virus response.

Flexibility in the format and construction of execution keys.

These modifications to a computing system's operating system software (OS) will ultimately result in a significant reduction in the incidence of computer virus infection, and in the elimination of the spread of computer viruses.

Other modifications and implementations will occur to those skilled in the art without departing from the spirit and the scope of the invention as claimed. Accordingly, the above description is not intended to limit the invention except as indicated in the following claims.

What is claimed is:

1. A method for inhibiting execution of malicious executable files and other unauthorized executable files by a computing system, the method comprising:
   (a) creating a unique execution key for each executable file authorized by a user to be run on a specific computing system wherein each said key is unique to its respective file and to the specific computing system upon which it is authorized to run; associating each said executable file with its respective execution key; storing execution key information for each said execution key in a key store separate from the executable file but accessible by the computing system;
   (b) when any executable file is queued to run on the computing system, examining the said executable file for an associated said execution key; and
   (c) if an associated said execution key is found, comparing the found execution key with the respective said stored execution key information to verify the validity of the found execution key, if the stored execution key information matches the found execution key, allowing the queued executable file to run at least once on the computing system, and if the stored execution key information does not match the found execution key, preventing the executable file from running.

2. The method of claim 1, wherein said associating the executable file comprises embedding the execution key within the executable file, and said examining the executable file comprises searching the executable file contents for the execution key.

3. The method of claim 1, wherein said associating the executable file comprises deriving the execution key based on the file contents, and said examining the executable file comprises deriving the execution key based on the file contents.

4. The method of claim 1, wherein the associating each said executable file with its respective execution key comprises encrypting the executable file with the execution key.

5. The method of claim 1, wherein the execution key information comprises a key that matches the found execution key.

6. The method of claim 1, wherein the execution key information is an equation for generating the execution key associated with the executable file.

7. The method of claim 1, wherein the execution key information is an equation for validating the execution key associated with the executable file.

8. The method of claim 1, wherein the associating each said executable file with its respective execution key comprises:
   including the execution key in the header of the executable file.

9. The method of claim 1, wherein the associating each said executable file with its respective execution key comprises:
   including the execution key in the footer of the executable file.

10. The method of claim 1, wherein the associating each said executable file with its respective execution key comprises:
    including the execution key in the body of the executable file.

11. The method of claim 1, wherein each executable file authorized to be run on a computing system comprises all executable files relating to the operating system and application layer code of the computing system.

12. The method of claim 1, further comprising:
  examining and authorizing by the user of the executable files.

13. The method of claim 1, wherein said allowing the executable file to run at least once comprises allowing the executable file to run only once.

14. The method of claim 1, wherein said examining the executable file for an associated said execution key further comprises:
  if a said associated execution key is not found, performing an automated missing key response.

15. The method of claim 1, wherein said examining the executable file for an associated said execution key further comprises:
  if the stored key information does not match the found execution key, performing an automated invalid key response.

16. The method of claim 14, wherein said automated missing key response comprising:
  preventing the executable file from running while determining whether the executable file is authorized by the user to be run on the computing system, and if so then repeating steps (a) and (b) for at least that executable file.

17. The method of claim 15, wherein said automated invalid key response comprises:
  preventing the executable file from running while determining whether the executable file is authorized by the user to be run on the computing system, and if so then deleting the found execution key and execution key information for that said executable file; and then repeating steps (a) and (b) for at least that executable file.

18. A method for inhibiting execution of malicious executable files and other unauthorized executable files by a computing system, the method comprising:
  (a) creating a unique execution key for each executable file authorized by a user to be run on a specific computing system wherein each said key is unique to its respective file and to the specific computing system upon which it is authorized to run; associating each said executable file with its respective execution key; storing execution key information for each said execution key in a key store separate from the executable file but accessible by the computing system; and
  (b) each time any executable file is queued to run on the computing system, examining the said executable file for an associated said execution key; and
    if an associated said execution key is not found, then performing an automated missing key response that will prevent the executable file from running without authorization; and
    if an associated said execution key is found, then comparing the stored execution key information for a match with the found execution key; whereas
      if the stored key information does not match the found execution key, then performing an automated invalid key response that will prevent the executable file from running without authorization; and
      if the stored execution key information matches the found execution key, then allowing the queued executable file to run once on the computing system.

19. The method of claim 18, wherein said automated missing key response comprises:
  preventing the executable file from running while determining whether the executable file is authorized by the user to be run on the computing system, and if so then repeating steps (a) and (b) for at least that executable file.

20. The method of claim 18, wherein said automated invalid key response comprises:
  preventing the executable file from running while determining whether the executable file is authorized by the user to be run on the computing system, and if so then deleting the found execution key and execution key information for that said executable file and repeating steps (a) and (b) for at least that executable file.

21. The method of claim 18, further comprising:
  before step (a), examining by the user of executable files associated with the specific computing system, and for each examined executable file one of authorizing by the user of the executable file to be run on the specific computing system and not authorizing by the user of the executable file to be run on the specific computing system.

22. The method of claim 21, wherein said examining and authorizing by the user comprises:
  examining and authorizing by the user of the executable files associated with the specific computing system in advance of loading the executable files authorized by the user onto the computing system.

23. The method of claim 18, wherein said (a) further comprises:
  loading the executable files and the key store on the computing system whereby the executable files and the key store are accessible by the computing system.

24. A method for inhibiting execution of malicious executable files and other unauthorized executable files by a computing system, the method comprising:
  (a) creating a unique execution key for each executable file authorized to be run on a specific computing system wherein each said key is unique to its respective file and to the specific computing system upon which it is authorized to run; associating each said executable file with its respective execution key; storing execution key information for each said execution key in a key store separate from the executable file but accessible by the computing system; and
  (b) when an executable file is queued to run on the computing system, examining the said executable file for an associated said execution key; if an associated said execution key is found, comparing the found execution key with the respective said stored execution key information to verify the validity of the found execution key; and if the stored execution key information matches the found execution key, allowing the queued executable file to run at least once on the computing system;
  else perform a configurable automatable action.

25. The method of claim 24, wherein said configurable automatable action comprises:
  preventing the executable file from running.

26. The method of claim 24, wherein said configurable automatable action comprises:
  preventing the executable file from running and quarantining the executable file.

27. The method of claim 24, wherein said configurable automatable action comprises:
  allowing the executable file to run once but not creating a new said unique key.

28. The method of claim 24, wherein said configurable automatable action comprises:
  allowing the executable file to run; and creating a new said unique key, associating it with the executable file, and storing it in the key store.

29. The method of claim 24, wherein said configurable automatable action comprises:

allowing the executable file to run; creating a new said unique key, associating it with the executable file, and storing it in the key store; and designating that all new executable files created by the executable file will have a respective new said unique key created for them, associated with them, and stored in the key store.

30. The method of claim 24, wherein said configurable automatable action comprises:
presenting a user interface to a privileged user and allowing the user to choose from a group of actions comprising:
allowing the executable file to run once;
preventing the executable file from running; and
allowing the executable file to run, creating a new said unique key for the executable file, associating it with the file, and storing it in the key store.

* * * * *